(12) United States Patent
Moon et al.

(10) Patent No.: US 11,156,877 B2
(45) Date of Patent: Oct. 26, 2021

(54) DISPLAY PANEL AND METHOD OF MANUFACTURING THE SAME

(71) Applicant: Samsung Display Co., Ltd., Yongin-Si (KR)

(72) Inventors: Su-mi Moon, Suwon-si (KR); Jooyoung Kim, Suwon-si (KR); Yongdoo Park, Cheonan-si (KR); Sung-kyu Shim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 256 days.

(21) Appl. No.: 16/118,854

(22) Filed: Aug. 31, 2018

(65) Prior Publication Data

US 2019/0094583 A1    Mar. 28, 2019

(30) Foreign Application Priority Data

Sep. 28, 2017    (KR) ......................... 10-2017-0126166

(51) Int. Cl.
*G02F 1/1339* (2006.01)
*G02F 1/1333* (2006.01)
(Continued)

(52) U.S. Cl.
CPC .......... *G02F 1/1339* (2013.01); *G02F 1/1309* (2013.01); *G02F 1/133351* (2013.01);
(Continued)

(58) Field of Classification Search
CPC ................. G02F 1/1339; G02F 1/1309; G02F 1/133351; G02F 1/133388
See application file for complete search history.

(56) References Cited

U.S. PATENT DOCUMENTS 8,721,392 B2    5/2014    Brown et al.
9,156,230 B2 *  10/2015   Tomamoto .............. C03C 27/00
(Continued)

FOREIGN PATENT DOCUMENTS

JP    2013022623 A    2/2013
KR    100659931 B1    12/2006
(Continued)

OTHER PUBLICATIONS

Google patent translation of Kazuya Kaida et al (JP 2009282107A) (Year: 2009).*

*Primary Examiner* — Lucy P Chien
(74) *Attorney, Agent, or Firm* — Cantor Colburn LLP

(57) ABSTRACT

A method of manufacturing a display panel includes providing a mother substrate in which a plurality of display cell areas is defined from which the display panel will be formed, the display cell areas arranged in along first and directions and each include a display unit cell corresponding to the display panel, and a dummy area extended along the second direction from the display unit cell dividing the mother substrate into the display unit cells each having the dummy area extended therefrom, by performing a wheel cutting process; separating the dummy area from the divided display unit cell by performing a laser cutting process; and curving the display unit cell from which the dummy area is separated, with reference to a reference axis which is parallel to the second direction, to form the display panel.

20 Claims, 25 Drawing Sheets

(51) Int. Cl.
*G02F 1/13* (2006.01)
*G02F 1/1362* (2006.01)

(52) U.S. Cl.
CPC .. *G02F 1/133354* (2021.01); *G02F 1/133388* (2021.01); *G02F 1/136286* (2013.01); *G02F 2201/56* (2013.01)

(56) References Cited

U.S. PATENT DOCUMENTS

| | | | | |
|---|---|---|---|---|
| 2001/0026349 | A1* | 10/2001 | Furukawa | G02F 1/1341 349/187 |
| 2003/0169392 | A1* | 9/2003 | Park | G02F 1/1339 349/153 |
| 2003/0173891 | A1* | 9/2003 | Chiba | H01L 51/5253 313/500 |
| 2009/0206334 | A1* | 8/2009 | Yoon | H01L 27/3276 257/48 |
| 2016/0037607 | A1* | 2/2016 | Kim | H05B 33/20 313/512 |
| 2017/0358762 | A1* | 12/2017 | Min | H01L 51/5237 |

FOREIGN PATENT DOCUMENTS

| | | |
|---|---|---|
| KR | 101160166 B1 | 6/2012 |
| KR | 1020120067207 A | 6/2012 |

\* cited by examiner

DISPLAY PANEL AND METHOD OF MANUFACTURING THE SAME

This application claims priority to Korean Patent Application No. 10-2017-0126166, filed on Sep. 28, 2017, and all the benefits accruing therefrom under 35 U.S.C. § 119, the content of which in its entirety is herein incorporated by reference.

BACKGROUND

1. Field

Embodiments of the invention relate to a display panel and a method of manufacturing the same and, more particularly, to a curved display panel and a method of manufacturing the same.

2. Description of the Related Art

Flat display devices such as liquid crystal display devices and organic light emitting display devices are used to display images in various information processing devices such as televisions, monitors, notebook computers and portable phones.

Curved display devices have been developed as applications of the flat display devices. The curved display device may include a display area having a curved shape to provide improved three-dimensional effect and sense of immersion (or immersiveness) to a user.

SUMMARY

Embodiments of the invention may provide a display panel with improved curved characteristics and a method of manufacturing the same.

In an embodiment of the invention, a display panel may include a first substrate; a second substrate facing the first substrate and coupled thereto, and a display element layer disposed between the first substrate and the second substrate and by which transmission of light through the display panel is controlled to display an image with the light. Each of the first substrate and the second substrate includes: a top surface with respect to a plane defined by a first direction and a second direction intersecting each other; a bottom surface opposite to the top surface; and side surfaces each connecting the top surface and the bottom surface to each other, among which: first side surfaces lengthwise extend in the first direction; and second side surfaces lengthwise extend in the second direction, the first substrate, the second substrate and the display element layer are each curved with respect to a reference axis lengthwise extended parallel to the second direction, and a roughness of the first side surfaces of the first substrate is different from a roughness of the first side surfaces of the second substrate.

One substrate among the first substrate and the second substrate which are each curved with respect to the reference axis may be further from the reference axis than the other substrate among the first substrate and the second substrate.

The roughness of the first side surfaces of the one substrate further from the reference axis may be less than the roughness of the first side surfaces of the other substrate among the first substrate and the second substrate. In addition, a roughness of the second side surfaces of each of the first and second substrates may be equal to the roughness of the first side surfaces of the other substrate among the first substrate and the second substrate.

A strength of the one substrate further from the reference axis may be greater than a strength of the first side surfaces of the other substrate among the first substrate and the second substrate.

In an embodiment of the invention, the display panel may further include a display area in which the image is displayed, and a non-display area surrounding the display area, and the image may be provided in a direction from the first substrate toward the second substrate.

The display panel may further include a display area in which the image is displayed with the light, and a non-display area surrounding the display area, and a sealant overlapping with the non-display area and disposed between the first substrate and the second substrate to surround the display element layer.

The sealant may include first and second sub-sealants each being parallel to the first direction and facing each other with the display element layer interposed therebetween, and third and fourth sub-sealants each being parallel to the second direction and connecting the first and second sub-sealants to each other.

The first and second sub-sealants may have a constant hardness in the second direction, and the first and second sub-sealants may be closer to the display area in the second direction than the first side surfaces and the third side surfaces, when viewed in a top plan view.

In an embodiment of the invention, the display panel may further include a display area, in which an image is displayed, and a non-display area surrounding the display area, and the image may be provided in a direction from the second substrate toward the first substrate.

In an embodiment of the invention, a method of manufacturing a display panel may include providing a mother substrate in which a plurality of display cell areas is defined from which the display panel will be formed, the display cell areas arranged in a first direction and a second direction which crosses the first direction, each display cell area including: a display unit cell corresponding to the display panel, including a first substrate and a second substrate coupled to each other with a display element layer and a sealant interposed therebetween, where the sealant surrounds the display element layer by which transmission of light through the display panel is controlled to display an image with the light, and a dummy area extended along the second direction from the display unit cell, portions of the first substrate or the second substrate defining the dummy area; dividing the mother substrate into the display unit cells each having the dummy area extended therefrom, by performing a wheel cutting process; separating the dummy area from the divided display unit cell by performing a laser cutting process; and curving the display unit cell from which the dummy area is separated, with reference to a reference axis which is parallel to the second direction, to form the display panel. The curving the display unit cell disposes one substrate among the first and second substrates closer to the reference axis, in the dividing of the mother substrate, the wheel cutting process includes cutting: the first and second substrates along precutting lines corresponding to side surfaces of the display panel which are extended in the second direction to which the reference axis is parallel, and the first substrate or the second substrate of which the portions thereof define the dummy area, along first cutting lines corresponding to an outer boundary of the dummy area which is extended in the first direction, and in the separating of the dummy area from the display unit cell, the laser cutting process includes cutting the other substrate among the first and second substrates which is further from the reference axis along second cutting lines corresponding to the side surfaces of the display panel which are extended in the first direction.

In an embodiment of the invention, the first substrate of the display unit cell may be the other substrate among the first and second substrates which is further from the reference axis and includes: a display area in which the image is displayed; a non-display area surrounding the display area; a pad area disposed extended from a first side of the non-display area in the second direction; a first dummy area disposed extended from the pad area at a first side of the non-display area, in the second direction; and a second dummy area disposed extended from a second side of the non-display area which is opposite to the first side thereof, in the second direction. The second substrate of the display unit cell may overlap with the display area and the non-display area of the first substrate and may not overlap with the pad area, the first dummy area and the second dummy area of the first substrate.

In the separating of the dummy area, the laser process may include cutting the first substrate as the other substrate among the first and second substrates which is further from the reference axis, along the second cutting lines which further correspond to: a first boundary between the first dummy area and the pad area, extended along the first direction; and a second boundary between the second dummy area and the non-display area, extended along the first direction.

The second substrate may include a display area in which the image is displayed and a non-display area surrounding the display area, respectively corresponding to the display area and the non-display area of the first substrate, the precutting lines may define the non-display area of each of the first and second substrate along the first direction, the first cutting lines may respectively define outer boundaries of the first dummy area and the second dummy area of the first substrate along the second direction, and the second cutting lines may define the non-display area and the pad area of the first substrate along the second direction.

The first substrate as the other substrate among the first and second substrates which is further from the reference axis may include: a pad in the pad area thereof, electrically connected to the display area of the first substrate, and a test pad in the first dummy area thereof, electrically connected to the pad in the pad area and through which a test signal is applied to the pad. The method may further include inspecting the display unit cell after the dividing of the mother substrate into the display unit cells.

The inspecting of the unit cell may include applying the test signal to the test pad that is disposed in the first dummy area and is electrically connected to the pad disposed in the pad area.

The laser cutting process may be performed using carbon dioxide ($CO_2$) laser in the separating of the dummy area.

In the separating of the dummy area, a portion of the other substrate among the first and second substrates which is further from the reference axis may define the dummy area, the laser process may further include cutting the other substrate which defines the dummy area along the second cutting lines which further correspond to boundaries between the dummy area and the display unit cell, and the portion of the other substrate which defines the dummy area may be separated from the display unit cell by using a vacuum breaker.

The second cutting lines along which the other substrate among the first and second substrates which is further from the reference axis is cut, may not overlap with the sealant.

In an embodiment of the invention, the first substrate of the display unit cell is the other substrate among the first and second substrates which is further from the reference axis and may include a display area in which the image is displayed, a non-display area surrounding the display area, and a first dummy area and a second dummy area disposed at opposing sides of the non-display area in the second direction, respectively.

The second substrate of the display unit cell may overlap with the display area and the non-display area of the first substrate, where the second substrate and may further include a pad area overlapping with the first dummy area and a third dummy area extended from a side of the pad area in the second direction.

In the separating of the dummy area, the laser process may include cutting the first substrate as the other substrate among the first and second substrates which is further from the reference axis, along the second cutting lines which further correspond to: a first boundary between cutting the first dummy area the non-display area, extended along the first direction; and a second boundary between the second dummy area and the non-display area, extended along the first direction.

The second substrate may further include a display area in which the image is displayed and a non-display area surrounding the display area, respectively corresponding to the display area and the non-display area of the first substrate, the precutting lines may define the non-display area of each of the first and second substrate along the first direction, the first cutting lines may define the non-display area and an outer boundary of the third dummy area of the second substrate, along the second direction, and the second cutting lines may define the non-display area of the first substrate, along the second direction.

The separating of the dummy area may further include a wheel cutting process in which the second substrate is cut along the second cutting lines which further correspond to a boundary between the third dummy area and the pad area.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
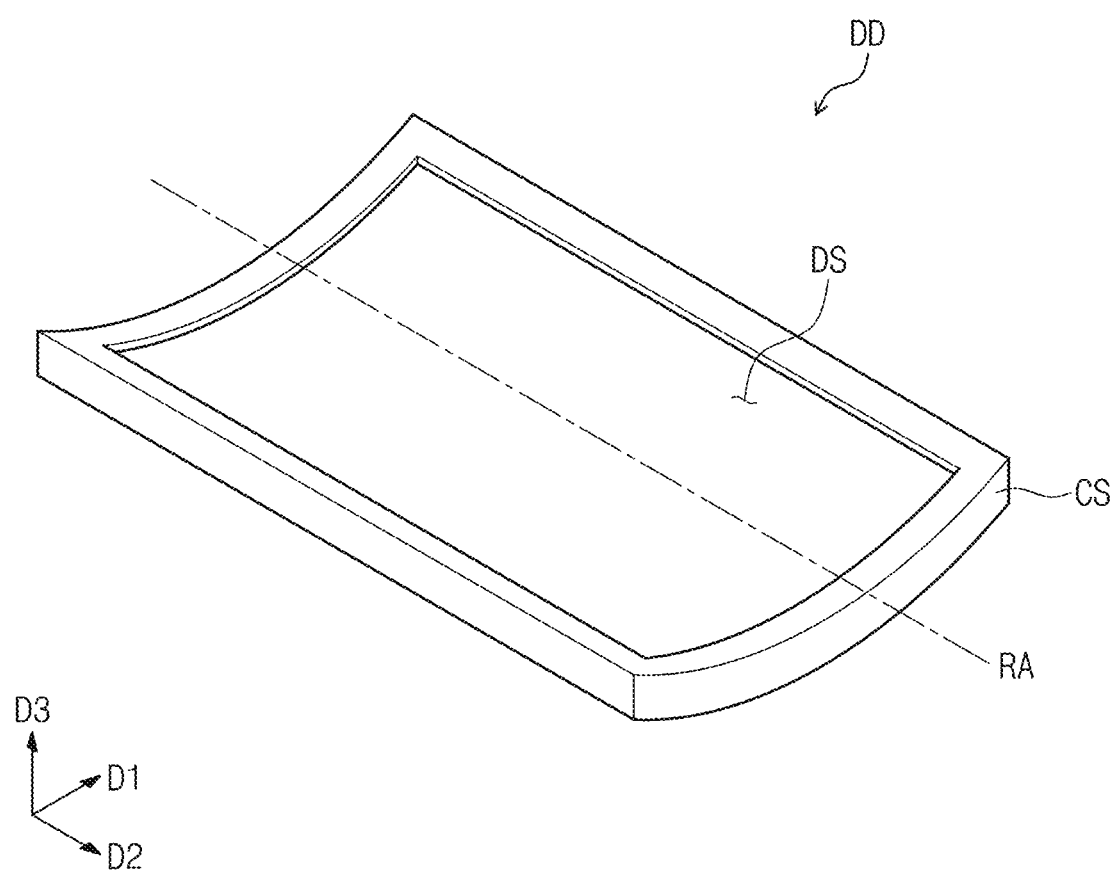
FIG. 1 is a perspective view illustrating an embodiment of a display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element such as a layer, region or substrate is referred to as being related to another element such as being "on" another element, it can be directly on the other element or intervening elements may be present. In contrast, when an element such as a layer, region or substrate is referred to as being related to another element such as being "directly on" another element, there are no intervening elements.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Exemplary embodiments are described herein with reference to cross-sectional illustrations and/or plane illustrations that are idealized exemplary illustrations. In the drawings, the thicknesses of layers and regions are exaggerated for clarity. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of exemplary embodiments.

Figure 2:
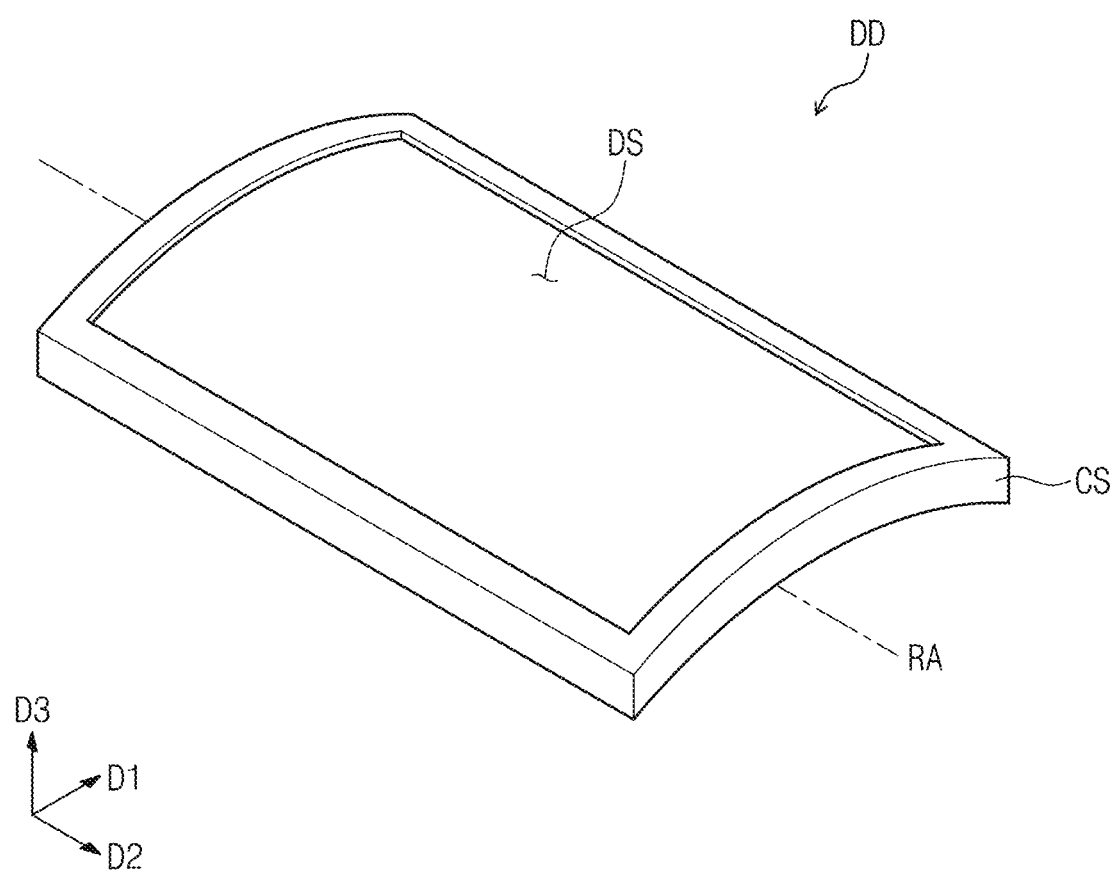
FIG. 2 is a perspective view illustrating an embodiment of a display device according to the invention.

FIGS. 1 and 2 are perspective views illustrating embodiments of a display device according to the invention.

Referring to FIGS. 1 and 2, a display device DD has a curved shape. Since the display device DD has the curved shape, a display surface DS of the display device DD may also have a curved shape. The display surface DS may have a shape curved with respect to a plane defined by a first direction D1 and a second direction D2 which intersects the first direction D1. The display device DD having the curved shape departs from the plane defined by the first and second directions D1 and D2, along a direction parallel to a third direction D3 which intersects each of the first and second directions D1 and D2. The display device DD may provide an image with improved three-dimensional effect, sense of immersion (or immersiveness) and presence through a surface thereof DS having the curved shape.

The display device DD may be curved about or with reference to a reference axis RA. The reference axis RA may be an imaginary line parallel to the second direction D2, without being limited thereto. The reference axis RA may be defined at a position which is spaced apart from a top surface of the curved display device DD by a predetermined distance along the third direction D3 which intersects each of the first and second directions D1 and D2.

In FIG. 1, the surface of the display device DD through which the image is displayed and provided to a user may be the display surface DS. Here, the display surface DS may have a shape concavely curved with respect to the first direction D1. In particular, a cross section of the display device DD may be concavely curved in a downward direction (e.g., away from a viewing side of the display device DD) to have a predetermined radius of curvature when viewed in a cross-sectional view taken along the first direction D1 and the third direction D3. As used herein the radius of curvature may mean a radius of curvature of a plane when viewed in a cross-sectional view defined by a curved direction of the plane and a direction substantially perpendicular to the plane.

In FIG. 2, the surface of the display device DD may through which the image is displayed and provided to a user may still be the display surface DS. Here, the display surface DS may have a shape convexly curved with respect to the first direction D1. In particular, a cross section of the display device DD may be convexly curved in an upward direction to have a predetermined radius of curvature when viewed in a cross-sectional view taken along the first direction D1 and the third direction D3.

In alternative exemplary embodiments, the surface of the display device DD through which the image is displayed and provided to a user may be a back surface of a case CS to be described later, which is opposite to the display surface DS indicated in FIGS. 1 and 2. For FIG. 1, the back surface of the case CS through which the image is displayed and provided to a user may have a shape concavely curved with respect to the first direction D1. For FIG. 2, the back surface of the case CS through which the image is displayed and provided to a user may have a shape convexly curved with respect to the first direction D1. That is, whether the display panel DP has a concave shape or a convex shape, the image may be displayed at the display surface DS or the back surface of the case CS.

Referring to FIGS. 1 and 2, the display device DD may include a display panel DP (see FIGS. 3A to 3C) to be described later and a case CS which protects the display panel DP.

The case CS may receive therein the display panel DP and may protect the display panel DP from an external impact. The case CS may have a curved shape. Since the case CS has the curved shape, an overall curved shape of the display panel DP may be maintained. The case CS may cover a back surface and a side surface of the display panel DP and an edge of the display surface DS of the display panel DP.

Figure 3A:
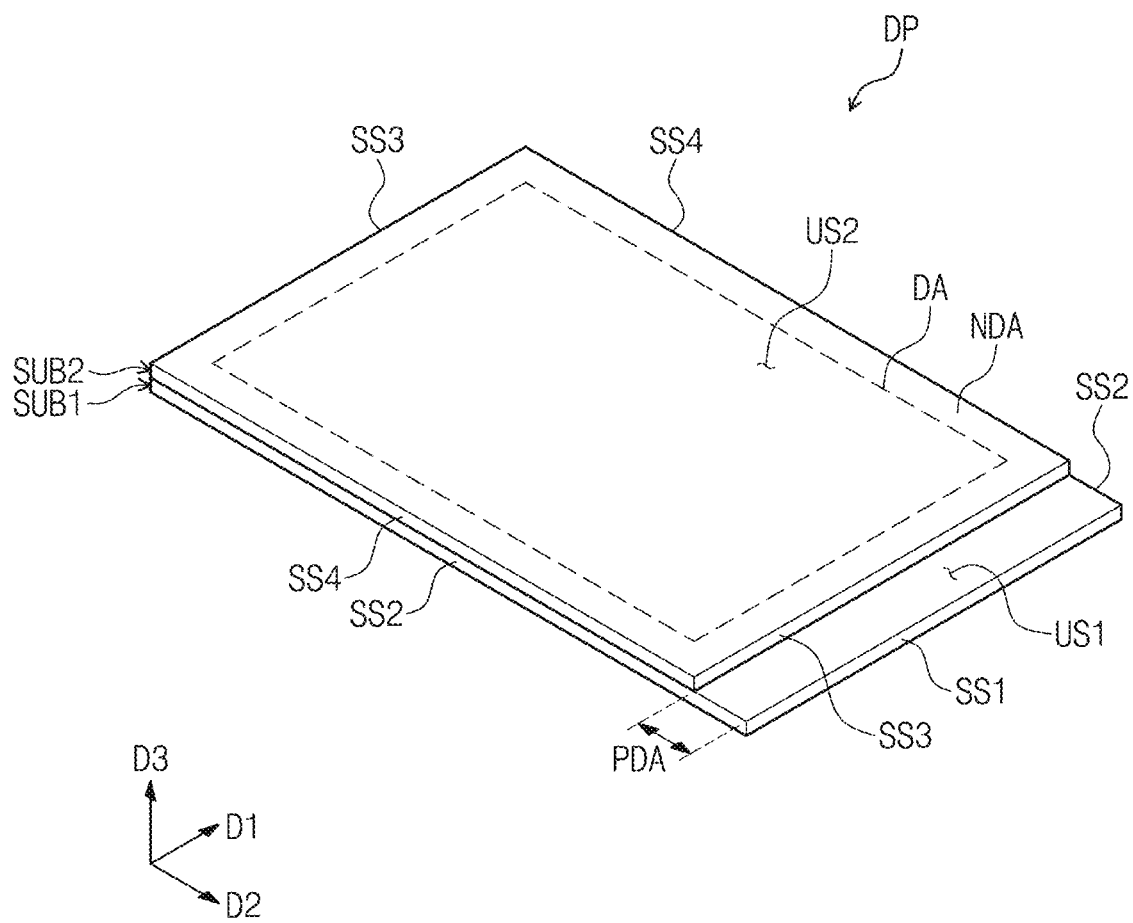
FIGS. 3A to 3C are perspective views illustrating embodiments of a display panel of a display device according to the invention.
Figure 3B:
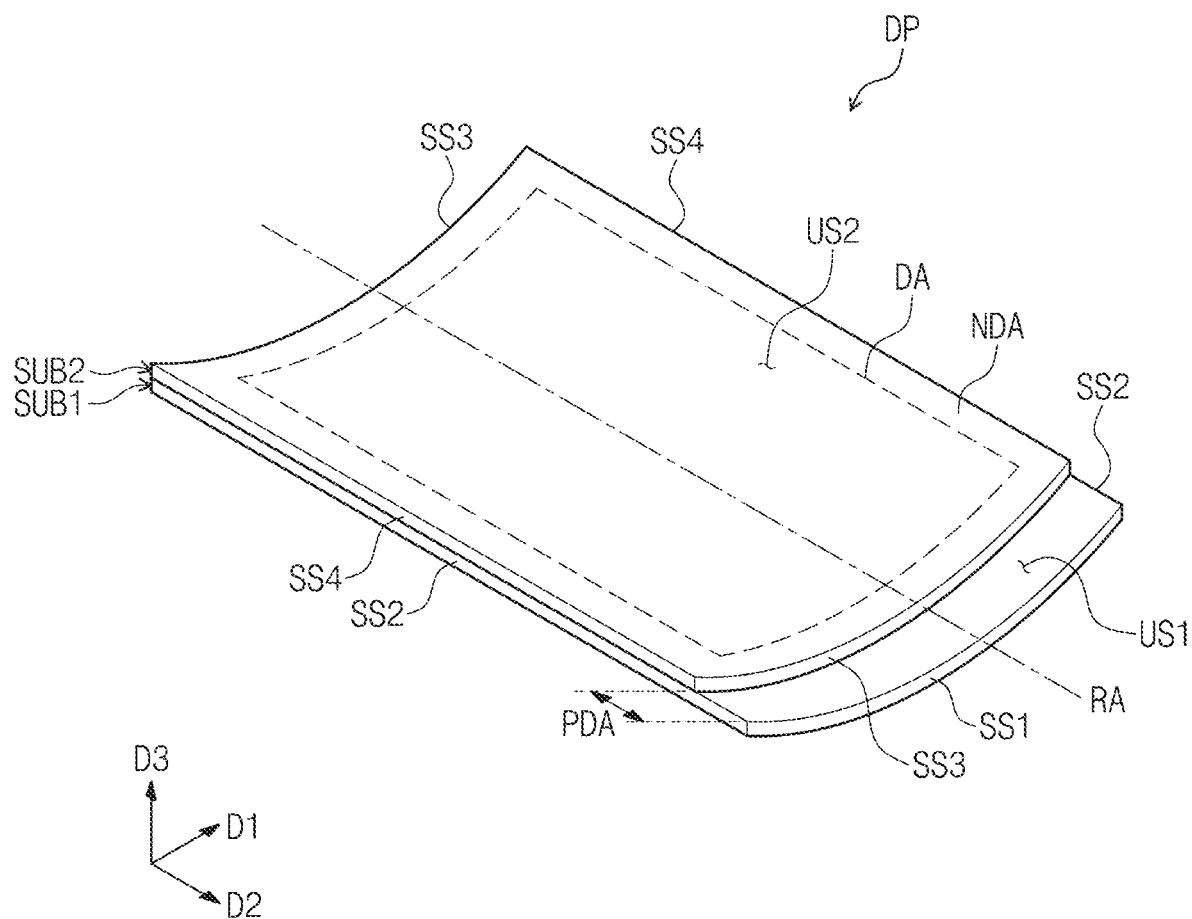
Figure 3C:
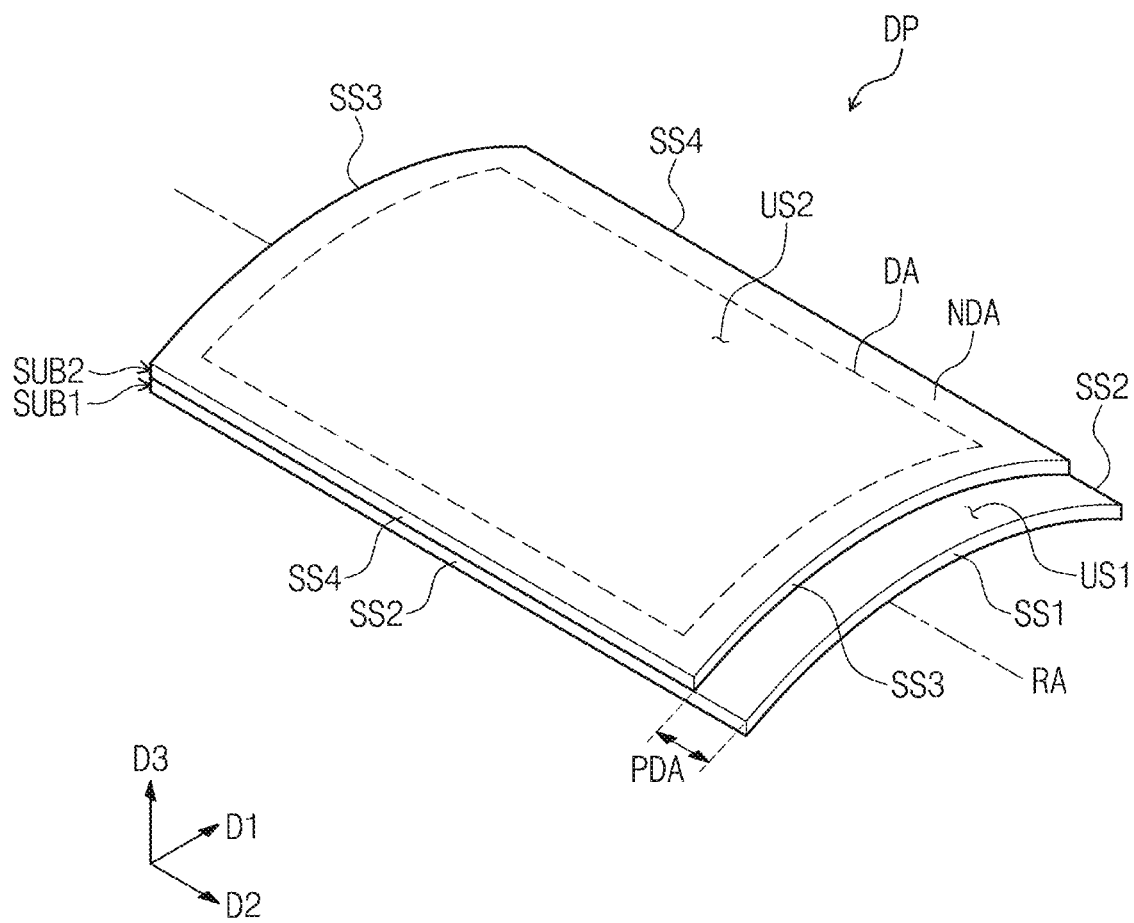

FIGS. 3A to 3C are perspective views illustrating embodiments of a display panel of a display device according to the invention. The display panel generates and displays an image with light.

Referring to FIGS. 3A to 3C, the display panel DP may include a display area DA in which an image is displayed with light, a non-display area NDA surrounding the display area DA and in which the image is not displayed, and a pad area PDA adjacent to the non-display area NDA and in which a (terminal) pad of the display panel DP is disposed. In an embodiment, the pad area PDA may be disposed at a side of the non-display area NDA in the second direction D2 and may lengthwise extend in the first direction D1. The pad area PDA may be considered a portion of an overall non-display area of the display panel DP which excludes the display area DA thereof.

In an embodiment of the invention, the display panel DP may have an overall plate shape and may be curved to have a certain radius of curvature. The display panel DP may have a curved shape corresponding to the curved shape of the case CS. The display panels illustrated in FIGS. 3B and 3C may be curved with reference from the shape of the display panel illustrated in FIG. 3A. That is to say, FIG. 3A may represent a flat (e.g., non-curved) display panel disposed in the plane defined by the first and second directions D1 and D2. The display panels illustrated in FIGS. 3B and 3C may be curved with respect to the shape illustrated in FIG. 3A.

In an embodiment, for example, the display surface DS of the display panel DP in the display device DD of FIG. 1 may have a shape which is concavely curved with respect to the reference axis RA, as illustrated in FIG. 3B. Alternatively, the display surface DS of the display panel DP in the display device DD of FIG. 2 may have a shape which is convexly curved, as illustrated in FIG. 3C.

The display panel DP may be a light receiving display panel such as a liquid crystal display panel, an electrowetting display panel, an electrophoretic display panel, or a microelectromechanical system ("MEMS") display panel. However, the kind of the display panel DP is not limited thereto. In other embodiments, the display panel DP may be a light generating display panel such as an organic light emitting display panel or a plasma display panel. Hereinafter, the liquid crystal display panel will be described as an example of the display panel DP.

Figure 4:
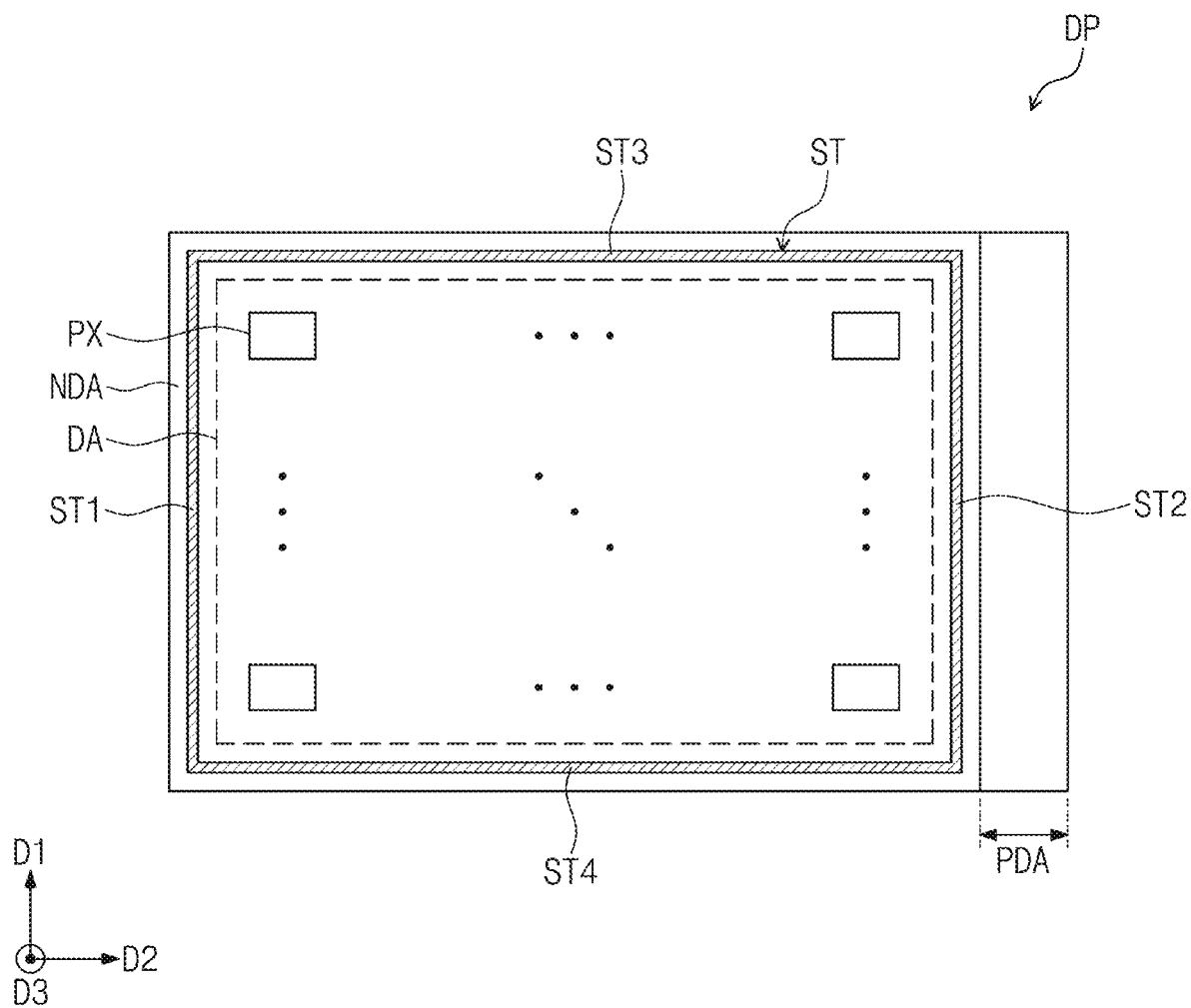
FIG. 4 is an embodiment of a top plan view illustrating a display panel according to the invention.
Figure 5:
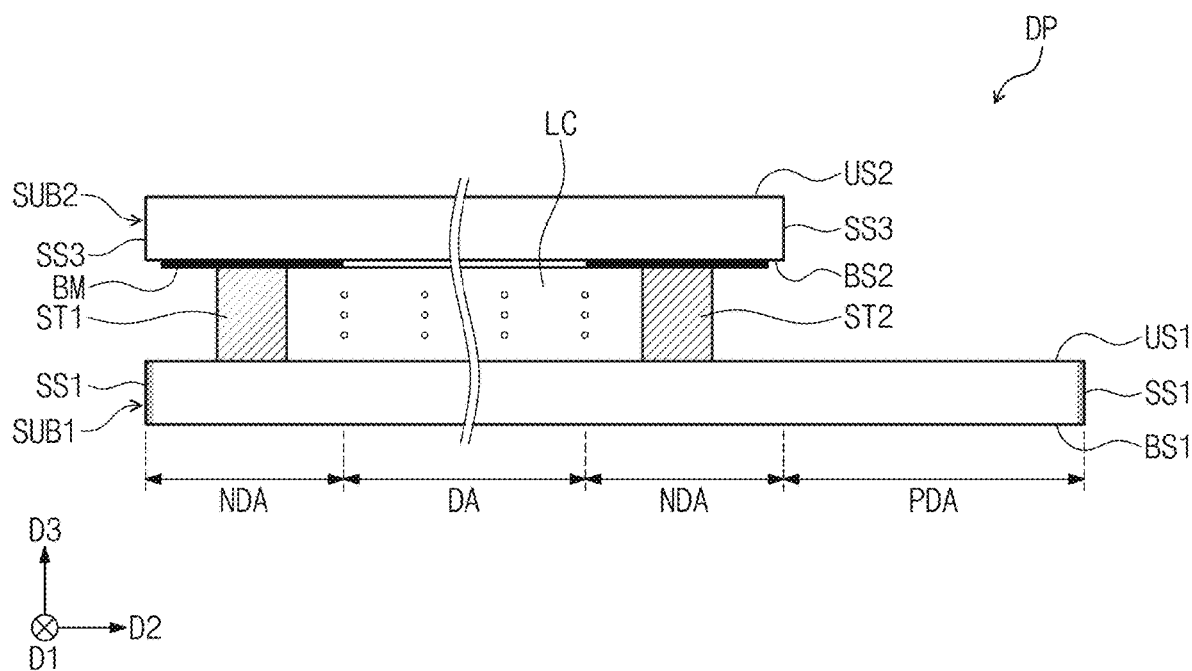
FIG. 5 is an embodiment of a cross-sectional view illustrating a display panel according to the invention.
Figure 6:
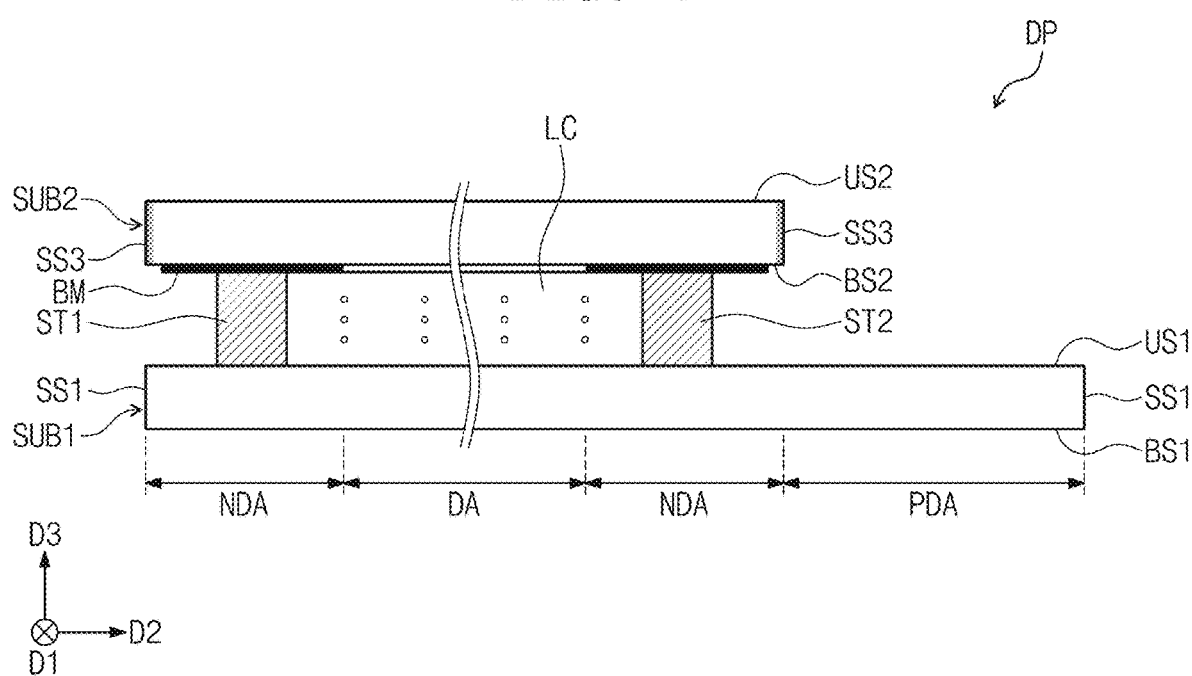
FIG. 6 is an embodiment of a cross-sectional view illustrating a display panel according to the invention.

FIG. 4 is an embodiment of a top plan view illustrating a display panel according to an embodiment of the invention. FIGS. 5 and 6 are embodiments of cross-sectional views illustrating display panels according to the invention. FIG. 5 is a cross-sectional view illustrating the display panel DP corresponding to FIG. 3B, and FIG. 6 is a cross-sectional view illustrating the display panel DP corresponding to FIG. 3C. An overall structure of the cross-sectional views of FIGS. 5 and 6 and the components of the display panels thereof may be generally applied to the display panel in FIG. 3A.

Referring to FIGS. 3A to 3C and 4 to 6, the display panel DP may include a first (display) substrate SUB1, a second (display) substrate SUB2 facing the first substrate SUB1, and a display element layer LC (hereinafter, referred to as 'a liquid crystal layer LC') disposed between the first substrate SUB1 and the second substrate SUB2.

Each of the display area DA, the non-display area NDA and the pad area PDA may be defined in the first substrate SUB1.

The first substrate SUB1 may include a first top surface US1 which is defined by the first and second directions D1 and D2 and corresponds to the display surface DS, a first bottom surface BS1 opposite to the first top surface US1, and a first side surface SS1 provided in plural opposing each other and a second side surface SS2 provided in plural opposing each other, where each of the side surfaces connect the first top surface US1 and the first bottom surface BS1 to each other.

The first side surfaces SS1 may each define a length thereof which extends in the first direction D1, where the first side surfaces SS1 may be spaced apart from each other in the second direction D2. The second side surfaces SS2 may be spaced apart from each other in the first direction D1 and may be connected to the first side surfaces SS1. The second side surfaces SS2 may each define a length thereof which extends in the second direction D2. The first side surfaces SS1 may be curved along curved shapes of the first top surface US1 and the first bottom surface BS1, such as curved long the first direction D1 without being limited thereto. Where the first side surfaces SS1 are curved along one direction, the second side surfaces SS2 may not be curved along a direction which intersects the one direction among directions which define a plane of the display panel DP.

The first substrate SUB1 may include a pixel PX provided in plural that each overlap with the display area DA and are disposed on the first top surface US1. Each of the pixels PX may include at least one switching element such as a thin film transistor (not shown) and a pixel electrode (not shown) which is connected to the thin film transistor. The pixel PX may be a basic unit of the display panel at which the image is generated and/or displayed with light.

The first substrate SUB1 may further include a signal line provided in plurality (not shown) connected to the pixels PX. A control, power and/or driving signal may be transmitted through the signal lines to the pixels PX, for controlling the pixels PX to generate and/or display an image with light. Each of the signal lines may overlap with both of the display area DA and the non-display area NDA. In addition, an end of each of the signal lines may disposed in the pad area PDA be connected to a pad (not shown) disposed in the pad area PDA. A control, power and/or driving signal may be input to or output from terminal ends of the signal lines at the pad area PDA, through the pad in the pad area PDA which is connected to the terminal ends of the signal lines.

The second substrate SUB2 may be disposed on the first substrate SUB1, and each of the display area DA and the non-display area NDA may be defined in the second substrate SUB2. A total planar area of the second substrate SUB2 is smaller than a total area of the first substrate SUB1 when viewed in a top plan view. The second substrate SUB2 may expose the pad area PDA of the first substrate SUB1.

The second substrate SUB2 may include a second top surface US2 disposed over the first top surface US1, a second bottom surface BS2 disposed between the second top surface US2 and the first top surface US1, and a third side surface SS3 provided in plural and a fourth side surface SS4 provided in plural where each of the side surfaces connect the second top surface US2 and the second bottom surface BS2 to each other.

The third side surfaces SS3 may each define a length which extends in the first direction D1, where the third side surfaces SS3 may be spaced apart from each other in the second direction D2. The fourth side surfaces SS4 may be spaced apart from each other in the first direction D1 and may be connected to the third side surfaces SS3. The fourth side surfaces SS4 may each define a length thereof which extends in the second direction D2. The third side surfaces SS3 of the second substrate SUB2 may be curved along curved shapes of the second top surface US2 and the second bottom surface BS2 such as curved long the first direction D1 without being limited thereto. Where the third side surfaces SS3 are curved along one direction, the fourth side surfaces SS4 may not be curved along a direction which intersects the one direction among directions which define a plane of the display panel DP.

The second substrate SUB2 may include a common electrode (not shown) disposed on the second bottom surface BS2. The common electrode and the pixel electrode may form an electric field that controls arrangement of liquid crystals included in the liquid crystal layer LC. A black matrix BM defining the non-display area NDA may be located on the second bottom surface BS2 of the second substrate SUB2. Thus, an image may be provided to a user through the second top surface US2 of the display area DA of the second substrate SUB2.

Referring to FIGS. 3B and 5, the second substrate SUB2 may be disposed closer to the reference axis RA than the first substrate SUB1, in the display panel DP according to an embodiment of the invention. Here, a roughness of the first side surfaces SS1 may be less than a roughness of the second side surfaces SS2. In addition, a roughness of the third side surfaces SS3 and a roughness of the fourth side surfaces SS4 may be substantially equal to the roughness of the second side surfaces SS2. In FIG. 5, the smaller roughness of the first side surfaces SS1 is indicated by a shaded area at end surfaces thereof. The absence of a shaded area at the third side surfaces SS3 indicates a greater roughness at end surfaces thereof compared to the end surfaces of the first side surfaces SS1.

Since the roughness of the first side surfaces SS1 is less than the roughnesses of each of the second to fourth side surfaces SS2 to SS4, occurrence of a crack at the first side surfaces SS1 may be reduced or inhibited even though a tensile stress applied to the first substrate SUB1 is greater than a tensile stress applied to the second substrate SUB2. The tensile strength may be determined with respect to a neutral plane at which there is neither compression stress nor tensile stress.

Here, a strength of the first side surfaces SS1 against cracking may be greater than a strength of the second side surfaces SS2 against cracking. In addition, a strength of the third side surfaces SS3 and a strength of the fourth side surfaces SS4 may be substantially equal to the strength of the second side surfaces SS2. In FIG. 5, the larger strength of the first side surfaces SS1 is indicated by a shaded area at end surfaces thereof. The absence of a shaded area at the third side surfaces SS3 indicates a smaller strength at end surfaces thereof compared to the end surfaces of the first side surfaces SS1.

Since the strength of the first side surfaces SS1 is greater than the strengths of the second to fourth side surfaces SS2 to SS4, occurrence of a crack at the first side surfaces SS1 may be reduced or inhibited even though a tensile stress applied to the first substrate SUB1 is greater than a tensile stress applied to the second substrate SUB2.

Referring to FIGS. 3C and 6, the first substrate SUB1 may be disposed closer to the reference axis RA than the second substrate SUB2, in the display panel DP according to an embodiment of the invention. Here, a roughness of the third side surfaces SS3 may be less than a roughness of the fourth side surfaces SS4. In addition, a roughness of the first side surfaces SS1 and a roughness of the second side surfaces SS2 may be substantially equal to the roughness of the fourth side surfaces SS4. In FIG. 6, the smaller roughness of the third side surfaces SS3 is indicated by a shaded area at end surfaces thereof. The absence of a shaded area at the first side surfaces SS1 indicates a greater roughness at end surfaces thereof compared to the end surfaces of the third side surfaces SS3.

Since the roughness of the third side surfaces SS3 is less than the roughnesses of each of the first, second and fourth side surfaces SS1, SS2 and SS4, occurrence of a crack at the third side surfaces SS3 may be reduced or inhibited even though a tensile stress applied to the second substrate SUB2 is greater than a tensile stress applied to the first substrate SUB1.

Here, a strength of the third side surfaces SS3 may be greater than a strength of the fourth side surfaces SS4. In addition, a strength of the first side surfaces SS1 and a strength of the second side surfaces SS2 may be substantially equal to the strength of the fourth side surfaces SS4. In FIG. 6, the larger strength of the third side surfaces SS3 is indicated by a shaded area at end surfaces thereof. The absence of a shaded area at the first side surfaces SS1 indicates a smaller strength at end surfaces thereof compared to the end surfaces of the third side surfaces SS3.

Since the strength of the third side surfaces SS3 is greater than the strengths of the first, second and fourth side surfaces SS1, SS2 and SS4, occurrence of a crack at the third side surfaces SS3 may be reduced or inhibited even though a tensile stress applied to the second substrate SUB2 is greater than a tensile stress applied to the first substrate SUB1.

Referring again to FIGS. 4 to 6, the display panel DP may further include a sealant ST surrounding the liquid crystal layer LC. The sealant ST may be provided between the first substrate SUB1 and the second substrate SUB1. The sealant ST may be in contact with the first top surface US1 of the first substrate SUB1 and the second bottom surface BS2 of the second substrate SUB2. The sealant ST may include an adhesive material. Thus, the sealant ST may fix the first substrate SUB1 and the second substrate SUB2 to each other.

The sealant ST may include first to fourth sub-sealants ST1 to ST4. The first and second sub-sealants ST1 and ST2 may be lengthwise extended parallel to the first direction D1 and may be spaced apart from each other in the second direction D2 with the liquid crystal layer LC interposed therebetween. In other words, the first and second sub-sealants ST1 and ST2 may face each other in the second direction D2 with the liquid crystal layer LC interposed therebetween. The third and fourth sub-sealants ST3 and ST4 may be lengthwise extended parallel to the second direction D2 and may be spaced apart from each other in the first direction D1 with the liquid crystal layer LC interposed therebetween. In other words, the third and fourth sub-sealants ST3 and ST4 may face each other in the first direction D1 with the liquid crystal layer LC interposed therebetween.

Here, the first and second sub-sealants ST1 and ST2 may have a constant hardening rate (e.g., constant hardness) in the second direction D2. The first and second sub-sealants ST1 and ST2 may be disposed closer to the display area DA in the second direction D2 than the first and third side surfaces SS1 and SS3 relative to the display area DA in the first direction D1, when viewed in a top plan view. Distances between the sub-sealants and the display area DA may be taken in a direction perpendicular to a length extension direction of a respective sub-sealant and the display area DA.

Hereinafter, an embodiment of a method of manufacturing a display panel DP according to the invention will be described with reference to the drawings. Hereinafter, the same components as described above will be indicated by the same reference designators, and the descriptions thereto will be omitted or mentioned briefly for the purpose of ease and convenience in description.

An embodiment of a method of manufacturing a display panel according to the invention may include providing a mother substrate including a plurality of cell areas, performing a wheel process (or a wheel cutting process) to divide the mother substrate into unit cells, inspecting the unit cells, separating a dummy area from each of the unit cells, and curving the unit cells from which the dummy area is separated.

FIGS. 7A to 12 are views illustrating an embodiment of a method of manufacturing a display panel, according to the invention. Hereinafter, a method of manufacturing the display panel DP corresponding to FIGS. 3B and 5 will be described with reference to FIGS. 7A to 12.

Figure 7A:
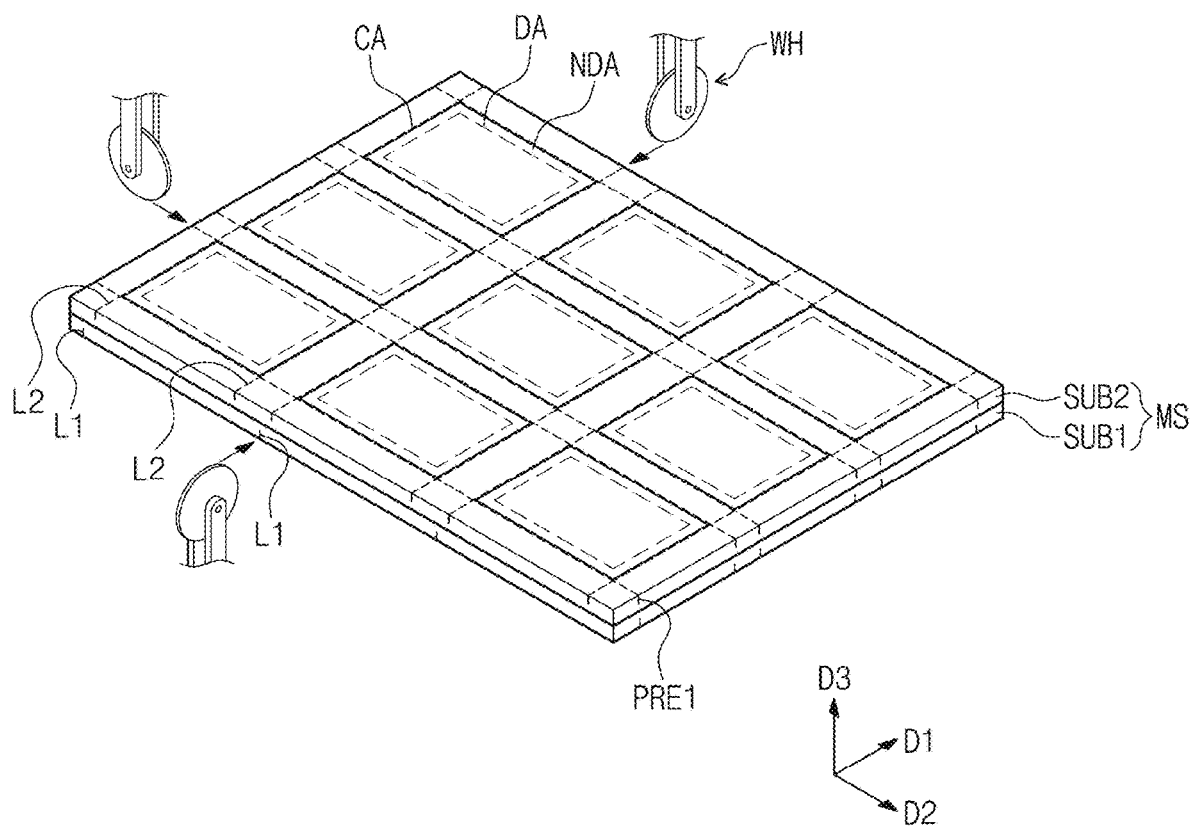
FIGS. 7A to 12 are views illustrating an embodiment of a method of manufacturing a display panel, according to the invention.
Figure 7B:
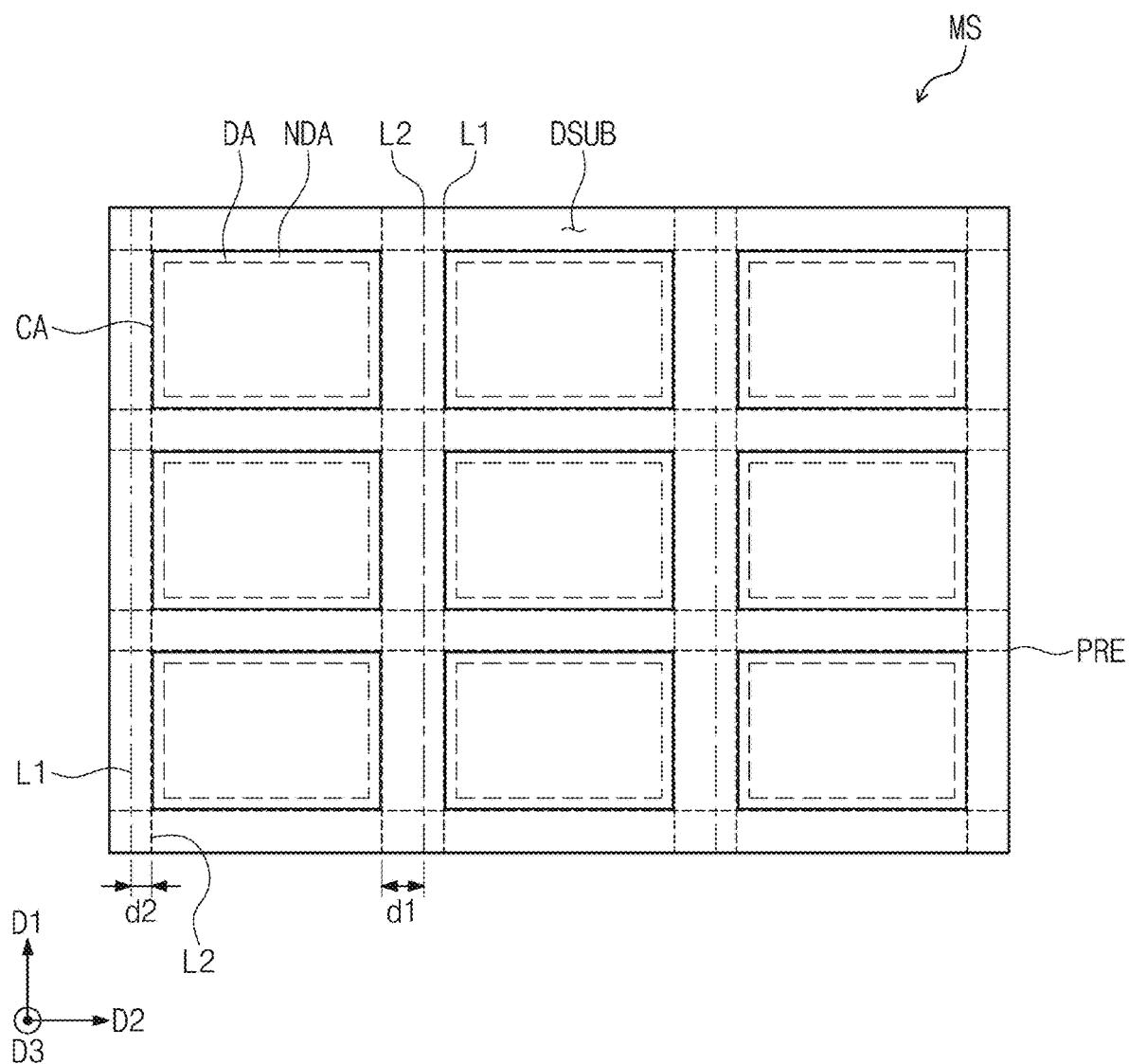
Figure 8A:
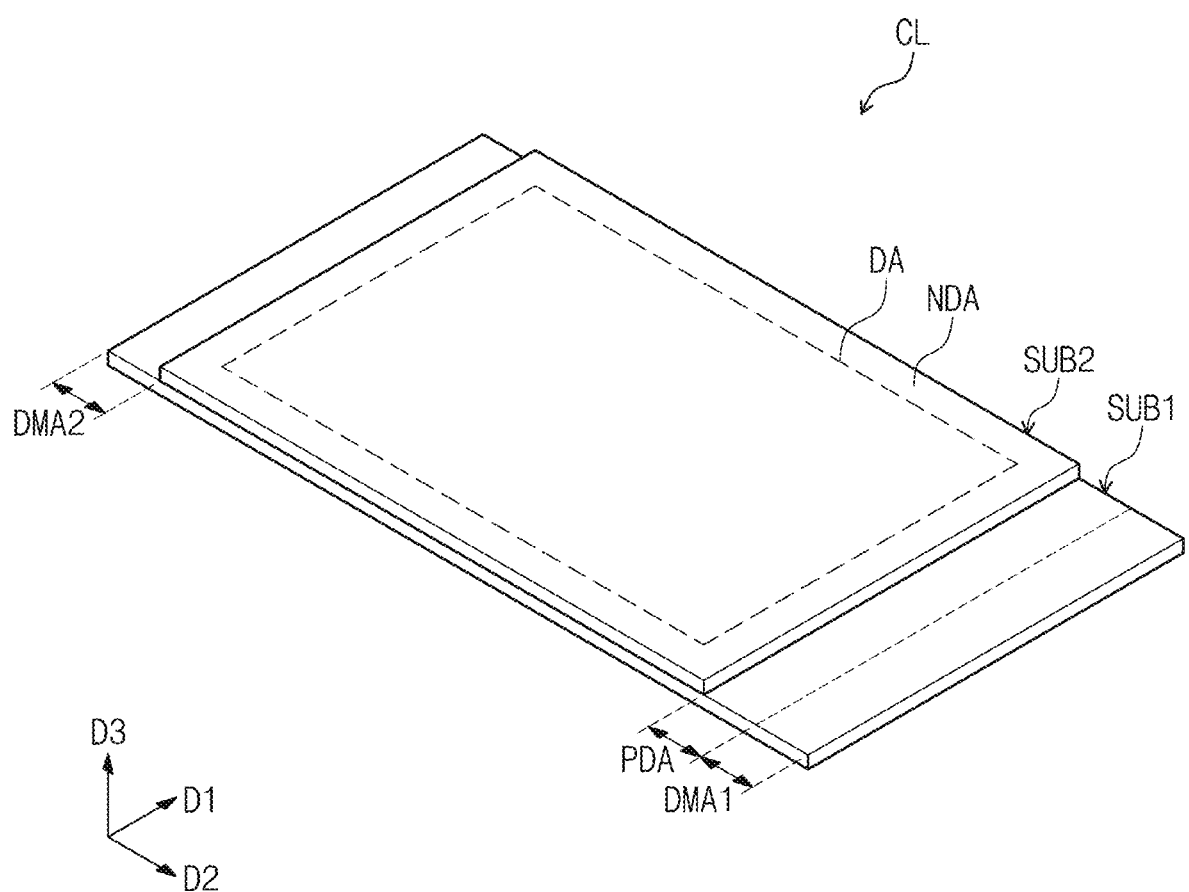
Figure 8B:
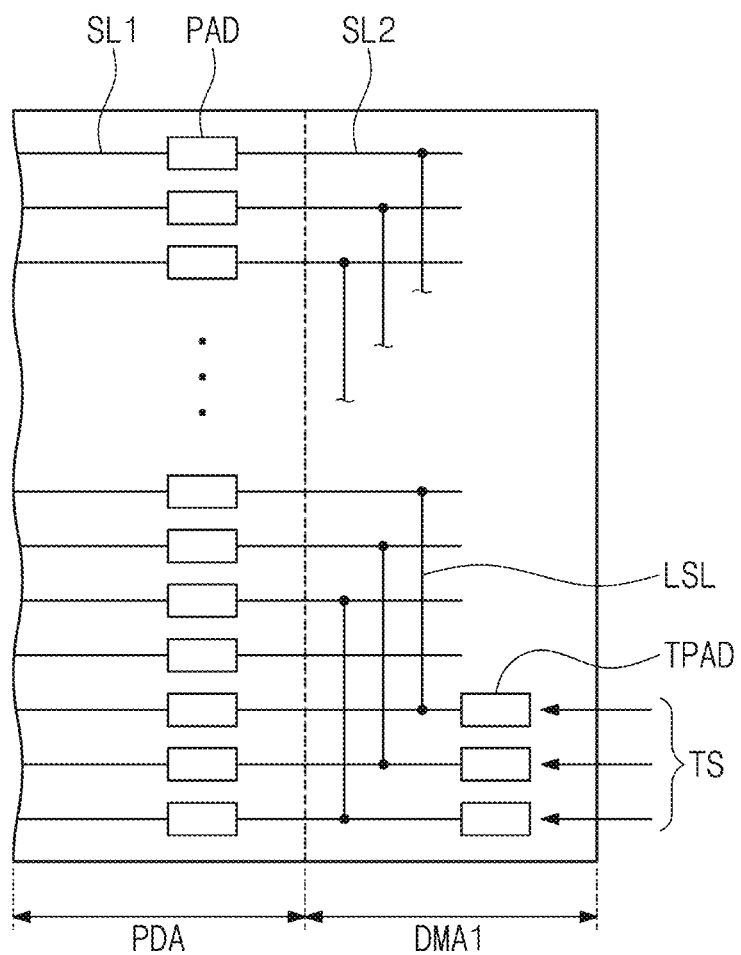

FIGS. 7A and 7B are a perspective view and a top plan view of a mother substrate MS, respectively. FIG. 8A is a perspective view illustrating a unit cell CL, and FIG. 8B is an enlarged top plan view illustrating a portion of the unit cell CL.

As illustrated in FIGS. 7A and 7B, the mother substrate MS in which a cell area CA provided in plurality is defined may be provided. The cell area CA may correspond to a unit cell CL. The mother substrate MS may include a first (mother) substrate SUB1 and a second (mother) substrate SUB2 which are coupled to each other to form the collective mother substrate MS. The liquid crystal layer LC (see FIG. 5) and the sealant ST (see FIG. 4) may be provided between the first substrate SUB1 and the second substrate SUB2.

The plurality of cell areas CA of the mother substrate MS may be separated from each other such that the mother substrate MS is divided into the unit cells CL, such as by a wheel process. A single one of the unit cells CL is illustrated in FIG. 8A. Each of the unit cells CL divided from the mother substrate MS may have the structure illustrated in FIG. 8A. The wheel process may be performed using a cutting wheel WH.

The cutting wheel WH may cut the display unit cells along a precutting lines PRE1 of the display unit cells, the precutting lines corresponding to side surfaces of the display panel which are extended in the second direction to which the reference axis is parallel, and then cut the first substrate SUB1 into separate portions thereof, along a first predetermined cutting line L1 of the first substrate SUB1. In addition, the cutting wheel WH may cut the second substrate SUB2 into separate portions thereof, along a second predetermined cutting line L2 of the second substrate SUB2. In an embodiment of the invention, the cutting wheel WH may be provided in plurality to cut the first substrate SUB1 and the second substrate SUB2 at the same time and/or in a same process.

Textures (not shown) may be formed at cross sections (e.g., end surfaces or side surfaces) of the separated portions of the first and substrates SUB1 and SUB2, by application of the cutting wheel WH applied alone a cutting line, in the third direction D3 or a direction inclined at a certain angle from the third direction D3 with reference to the plane defined by the first and second directions D1 and D2. Thus, the cross sections of the separated portions of the first and second substrates SUB1 and SUB2, formed by the cutting wheel WH, may have a specific roughness.

As illustrated in FIG. 8A, each of a display area DA, a non-display area NDA, a pad area PDA and a dummy area may be defined in the first substrate SUB1 of the unit cell CL. The pad area PDA may be disposed at one side of the non-display area NDA in the second direction D2. The dummy area may include a first dummy area DMA1 disposed at a first side of the pad area PDA as a portion of the non-display area in the second direction D2, and a second dummy area DMA2 disposed at a second side opposite to the first side, of the non-display area NDA in the second direction D2. The first predetermined cutting line L1 may define the first dummy area DMA1 and the second dummy area DMA2 of the first substrate SUB1. That is, the first predetermined cutting line L1 may correspond or form opposing end surfaces of the first and second dummy areas DMA1 and DMA2 defined for the first substrate SUB1.

Each of a display area DA and a non-display area NDA may be defined in the second substrate SUB2 of the unit cell CL. The display area DA and the non-display area NDA of the second substrate SUB2 may overlap with the display area DA and the non-display area NDA of the first substrate SUB1 but may not overlap with the pad area PDA, the first dummy area DMA1 and the second dummy area DMA2 of the first substrate SUB1. The second predetermined cutting line L2 may define the display area DA and the non-display area NDA of the second substrate SUB2. That is, the second predetermined cutting line L2 may correspond or form opposing end surfaces of the non-display area defined for the second substrate SUB2 in the second direction D2.

As illustrated in FIG. 7B, the first predetermined cutting line L1 lengthwise extending in the first direction D1 may be spaced apart from the second predetermined cutting line L2 lengthwise extending in the first direction D1 by a certain distance in the second direction D2 when viewed in a top plan view. The first predetermined cutting line L1 disposed at a first side of the non-display area NDA may be spaced apart from the second predetermined cutting line L2, disposed at the same first side of the non-display area NDA, by a first distance d1. The first predetermined cutting line L1 disposed at a second side of the non-display area NDA opposite to the first side thereof may be spaced apart from the second predetermined cutting line L2, disposed at the same second side of the non-display area NDA, by a second distance d2. Here, the first distance d1 may be equal to or greater than the second distance d2.

The first predetermined cutting line L1 lengthwise extending in the second direction D2 may overlap with (e.g., be aligned with) the second predetermined cutting line L2 lengthwise extending in the second direction D2 when viewed in a top plan view. Thus, cross sections (e.g., side surfaces), lengthwise extending in the second direction D2, of the first and second substrates SUB1 and SUB2 of the unit cell CL may be disposed in the substantially same plane. That is, the second direction D2 first and second predetermined cutting lines L1 and L2 may correspond or form opposing end surfaces of the non-display area defined for the second substrate SUB2 in the first direction D2.

Even though not shown in the drawings, a breaking process for separating a dummy substrate DSUB adjacent to the unit cell CL may be performed after the wheel process. The dummy substrate DSUB within the mother substrate MS may be disposed at each of opposing sides of cell areas CA arranged along a row in the second direction D2 to be common with each of the cell areas CA of the row. After the dummy substrates DSUB are separated, the unit cell CL may be provided as illustrated in FIG. 8A. That is, the dummy substrates DSUB may be separated from a remainder of the mother substrate MS along the second direction D2 first and second predetermined cutting lines L1 and L2. The aligned first and second predetermined cutting lines L1 and L2 may be provided in plurality to correspond to a boundary between the non-display area NDA and the dummy substrate DSUB.

Thereafter, in the inspection of the unit cell CL, operation of the unit cell CL and/or the pixels therein are tested to determine whether the pixels PX (see FIG. 4) operate properly or are defective.

Referring to FIG. 8B, (conductive) signal lines and (terminal) pads may be disposed in the pad area PDA and the first dummy area DMA1.

A first signal line SL1 provided in plurality, a pad provided in plurality and respective portions of a second signal line SL2 provided in plurality may be disposed in the pad area PDA. The first signal lines SL1 disposed in the pad area PDA may extend to the display area DA to be connected to the pixels PX in the display area DA (see FIG. 4), and the pads PAD disposed in the pad area PDA may be connected to (terminal) ends of the first signal lines SL1, respectively. Portions of the second signal lines SL2 disposed in the pad area PDA may be connected to the pads PAD therein and may extend into the first dummy area DMA1 to define remaining portions of the second signal lines SL2 and terminate therein in the first dummy area DMA1.

A test pad TPAD provided in plurality to be connected to the pads PAD and remaining portions of the second signal lines SL2 may be disposed in the first dummy area DMA1. A test signal TS provided in plurality may be applied to the test pads TPAD.

Some of the second signal lines SL2 may be connected to each other through a connection line LSL such that a test signal TS is commonly applied to such connected second signal lines SL2. In an embodiment, for example, the connection line LSL may connect more than one second signal line SL2 which are connected to pixels PX emitting light of the same color, to each other. Thus, it is possible to check or determine whether the pixels PX normally emit light by the test signals TS applied to the test pads TPAD.

The second dummy area DMA2 may include features therein described above for the first dummy area DMA1, without being limited thereto. For either the first or second dummy area DMA1 or DMA2 of a unit cell CL, layers and/or elements of the respective dummy area may not be necessary in the display panel DP formed from the unit cell CL. Therefore, the respective dummy area may be separated from a remainder of the unit cell CL forming a portion of the display panel DP.

Figure 9:
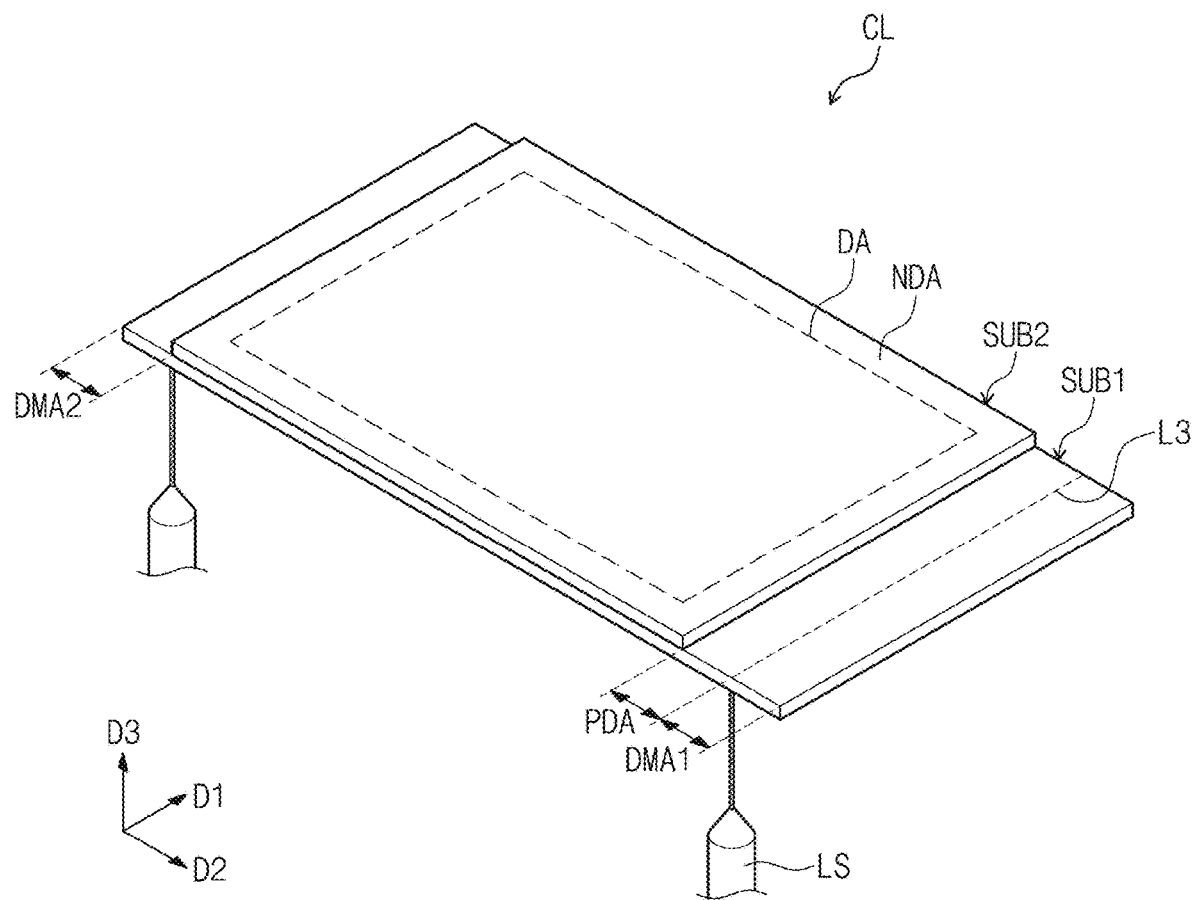
Figure 10:
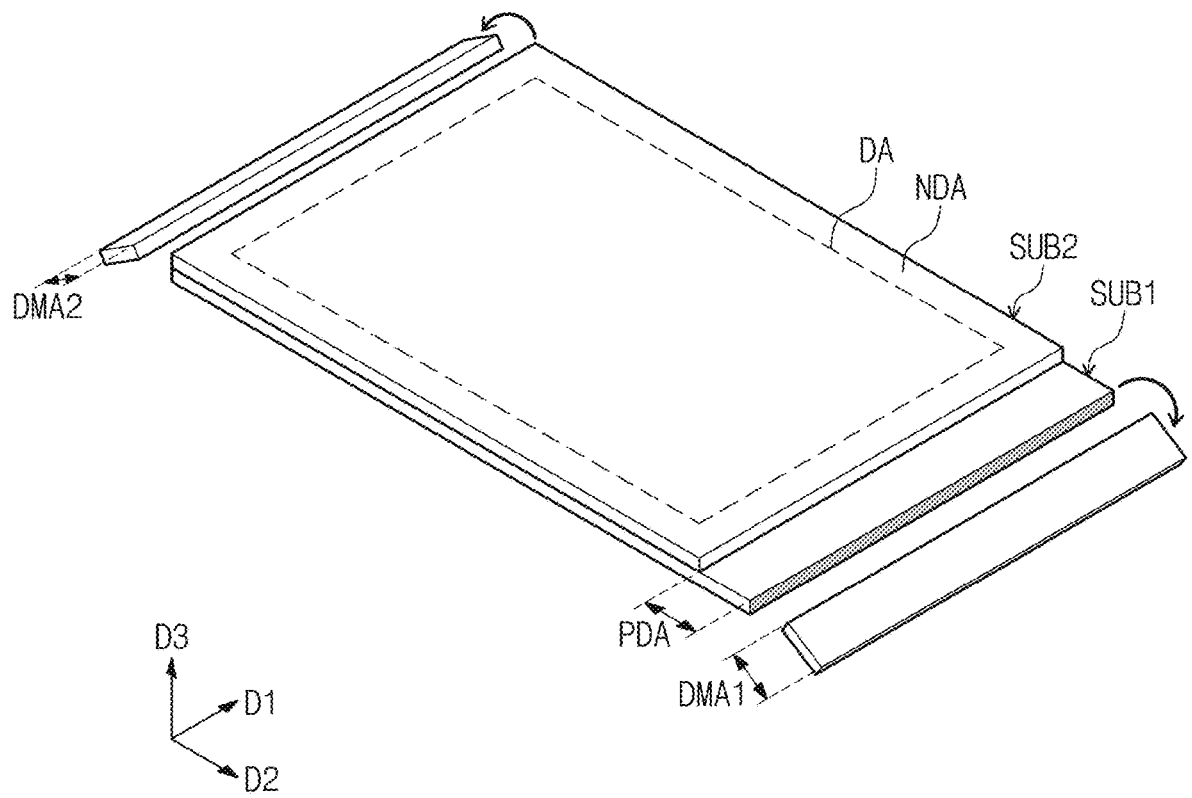
Figure 11A:
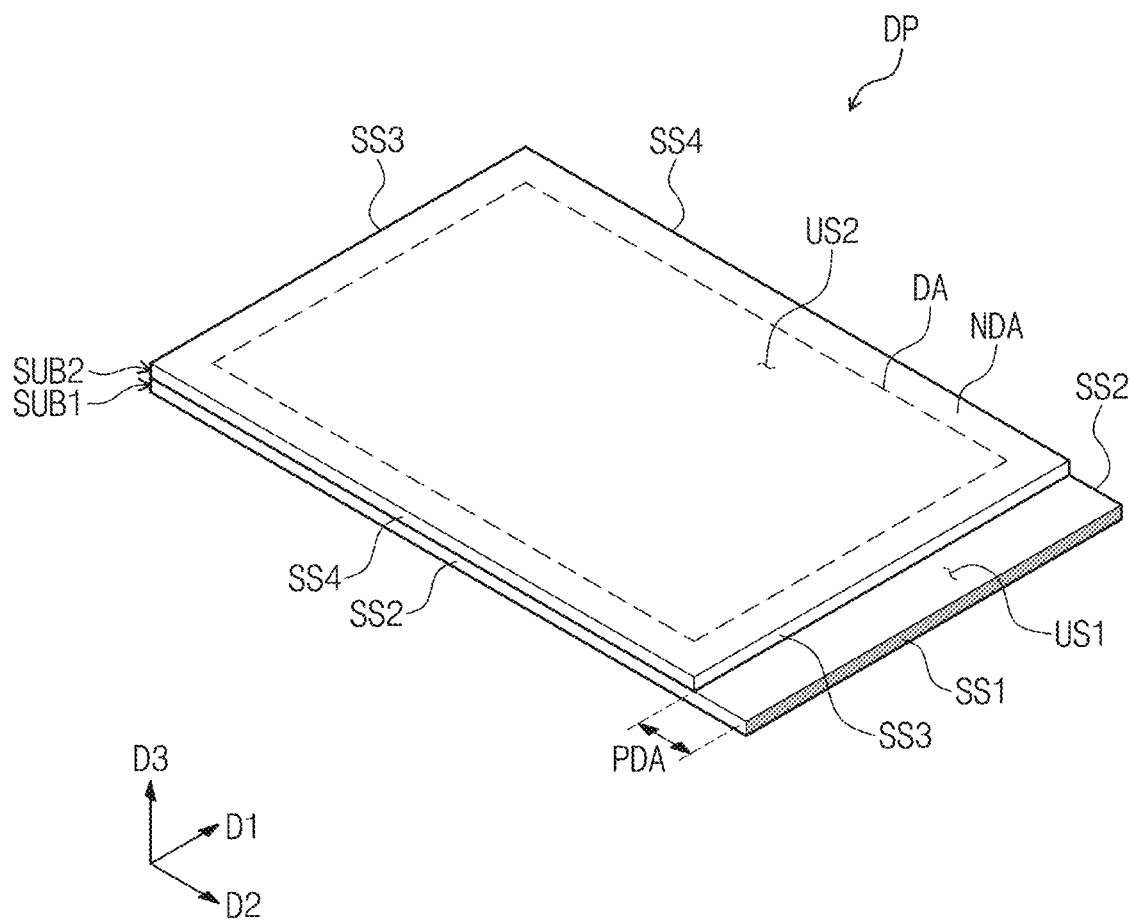
Figure 11B:
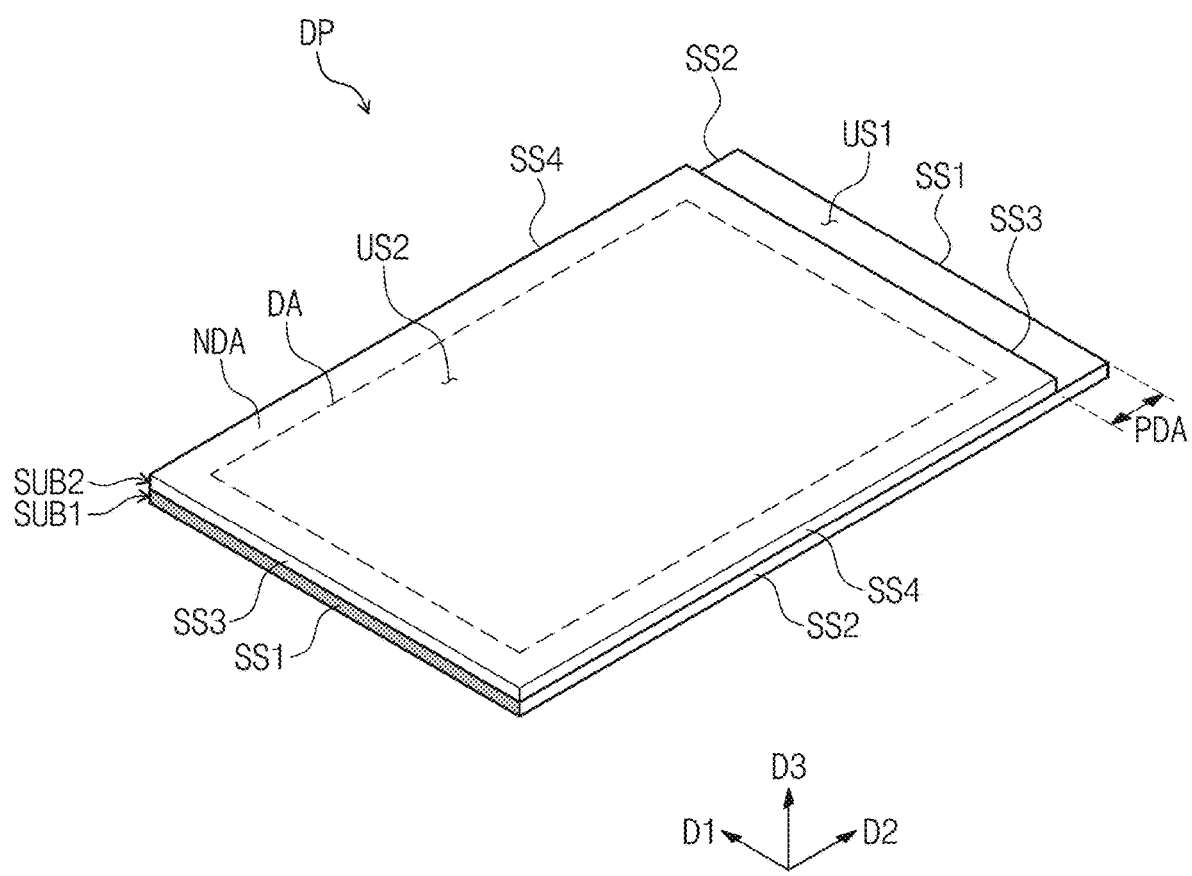

FIGS. 9 and 10 are perspective views illustrating of the unit cell CL. FIGS. 11A and 11B are perspective views illustrating a display panel DP.

Referring to FIG. 9, the process of separating the dummy area may include a process of cutting the first dummy area DMA1 and a process of cutting the second dummy area DMA2 away from a remainder of the unit cell CL.

The first dummy area DMA1 and the second dummy area DMA2 may be cut using a laser LS. The laser LS may cut the first substrate SUB1 along a third predetermined cutting line L3 of the first substrate SUB1. The third predetermined cutting line L3 may lengthwise extend in the first direction D1 and may define the non-display area NDA and the pad area PDA of the first substrate SUB1. The third predetermined cutting line L3 does not overlap with the sealant ST (see FIG. 4). The third predetermined cutting line L3 may be provided in plurality to correspond to a boundary between the pad area PDA and the first dummy area DMA1 and a boundary between the non-display area NDA and the second dummy area DMA2.

In one or more embodiment, the laser LS may be carbon dioxide ($CO_2$) laser. In the laser cutting process, a cross section (e.g., a side surface) of the first substrate SUB1 cut by the laser LS may be denatured by heat of the laser LS, to increase a strength at the cross-section. Thus, a strength of the cross section of the first substrate SUB1 which is formed by the laser cutting process may be stronger than that of a peripheral portion thereof such as at other cross-sections formed by the wheel cutting process described above.

Referring to FIG. 10, after the laser cutting process is performed, a breaking process may be performed to separate the first dummy area DMA1 and the second dummy area DMA2 of the first substrate SUB1 from a remainder thereof. The breaking process may be performed using a vacuum breaker without being limited thereto.

A (surface) roughness of the cross section of the first substrate SUB1 which is formed by the laser LS may be less than (surface) roughnesses of the cross sections of the first and second substrates SUB1 and SUB2 which are formed by the cutting wheel WH process.

Since the first and second dummy areas DMA1 and DMA2 are separated from a remainder of the unit cell CL, a display panel DP may be provided or realized by the remainder of the unit cell CL. In the display panel DP, first to fourth side surfaces SS1 to SS4 are each exposed outside the display panel DP.

As illustrated in FIGS. 11A and 11B, a roughness of first side surfaces SS1 of the first substrate SUB1 of the display panel DP may be less than a roughness of second side surfaces SS2 of the first substrate SUB1. In addition, roughnesses of third and fourth side surfaces SS3 and SS4 of the second substrate SUB2 of the display panel DP may be substantially equal to the roughness of the second side surfaces SS2. In FIGS. 11A and 11B, the larger strength of the first side surfaces SS1 is indicated by a shaded area at end surfaces thereof. The absence of a shaded area at the second, third and fourth side surfaces SS2, SS3 and SS4 indicates a smaller strength at end surfaces thereof compared to the end surfaces of the first side surfaces SS1.

Figure 11C:
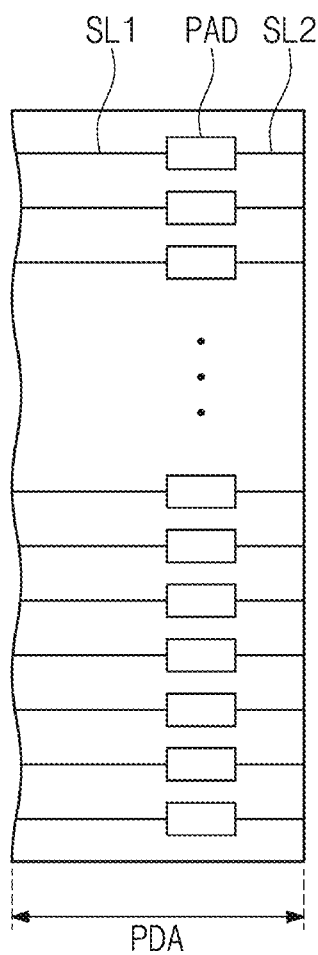

Referring to FIG. 11C, the first signal lines SL1, the pads PAD and the portions of the second signal lines SL2 may be disposed in the pad area PDA of the display panel DP. The portions of the second signal lines SL2 may remain in the pad area PDA to terminate at a boundary of the pad area PDA since remaining portions of the second signal lines SL2 disposed in the first dummy area DMA1 are disconnected and removed from the pad area PDA.

Figure 12:
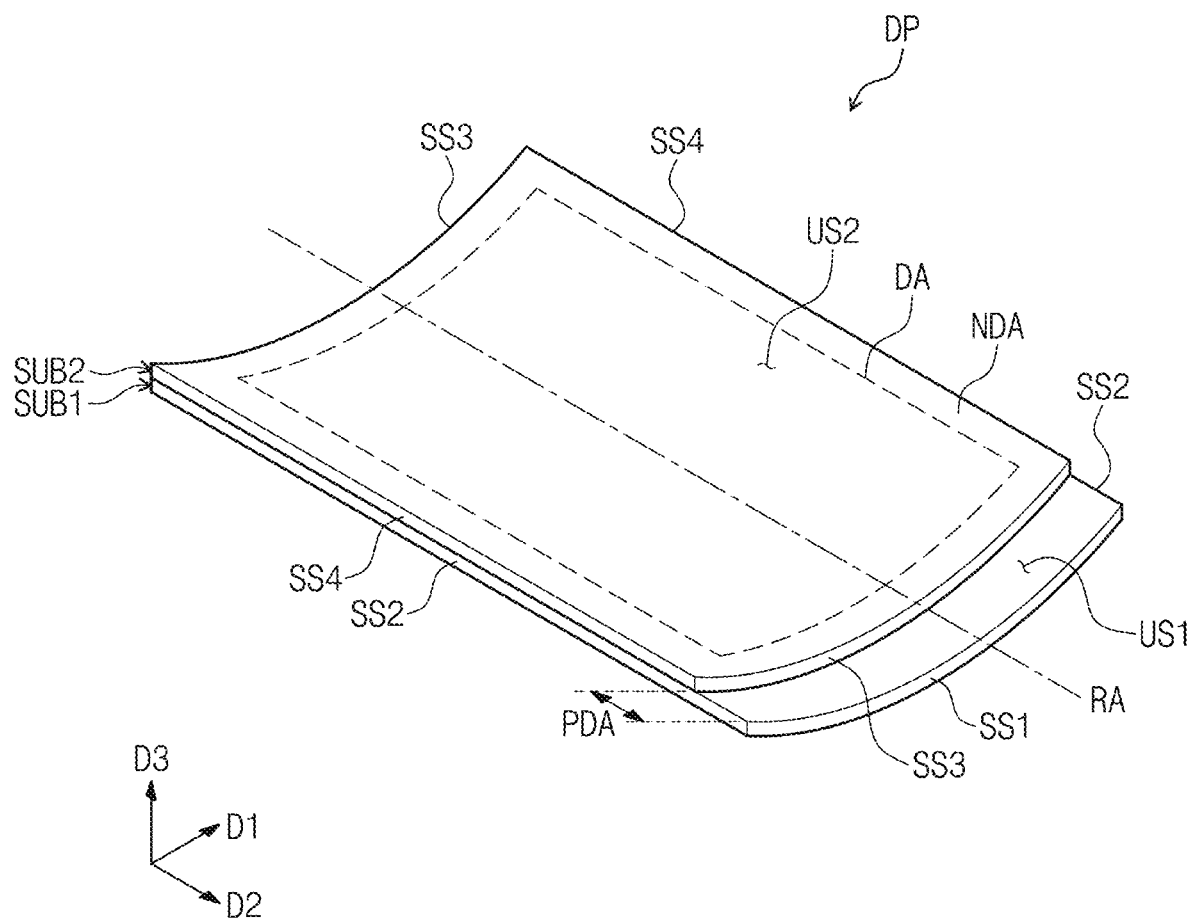

FIG. 12 is a perspective view illustrating the display panel DP provided or realized by the remainder of the unit cell CL, in a curved state.

Referring to FIG. 12, the display panel DP may be provided in a curved shape. At this time, the display panel DP may be curved by a force applied from an external tool or an external member of the display device DD such as the case CS (see FIG. 1).

The display panel DP may be curved with respect to a reference axis RA which is parallel to the second direction D2 and is closer to the second substrate SUB2 than the first substrate SUB1.

At this time, since the roughness of the first side surfaces SS1 is less than the roughnesses of the second to fourth side surfaces SS2 to SS4 among surfaces exposed outside the display panel DP, occurrence of a crack at the first side surfaces SS1 may be reduced or inhibited even though a tensile stress applied to the first substrate SUB1 is greater than a tensile stress applied to the second substrate SUB2.

In addition, since the strength of the first side surfaces SS1 is greater than the strengths of the second to fourth side surfaces SS2 to SS4, occurrence of a crack at the first side surfaces SS1 may be reduced or inhibited even though a tensile stress applied to the first substrate SUB1 is greater than a tensile stress applied to the second substrate SUB2.

Furthermore, in one or more embodiment of the invention, the wheel process may be performed on the first and second substrates SUB1 and SUB2 at the same time, and then, the laser cutting process may be performed only on the first substrate SUB1. Thus, a process time can be reduced as compared with a case in which a laser cutting process is successively performed on the first substrate SUB1 and the second substrate SUB2.

FIGS. 13 to 19 are views illustrating an embodiment of a method of manufacturing a display panel, according to the invention. Hereinafter, a method of manufacturing the display panel DP corresponding to FIGS. 3C and 6 will be described with reference to FIGS. 13 to 19.

Figure 13:
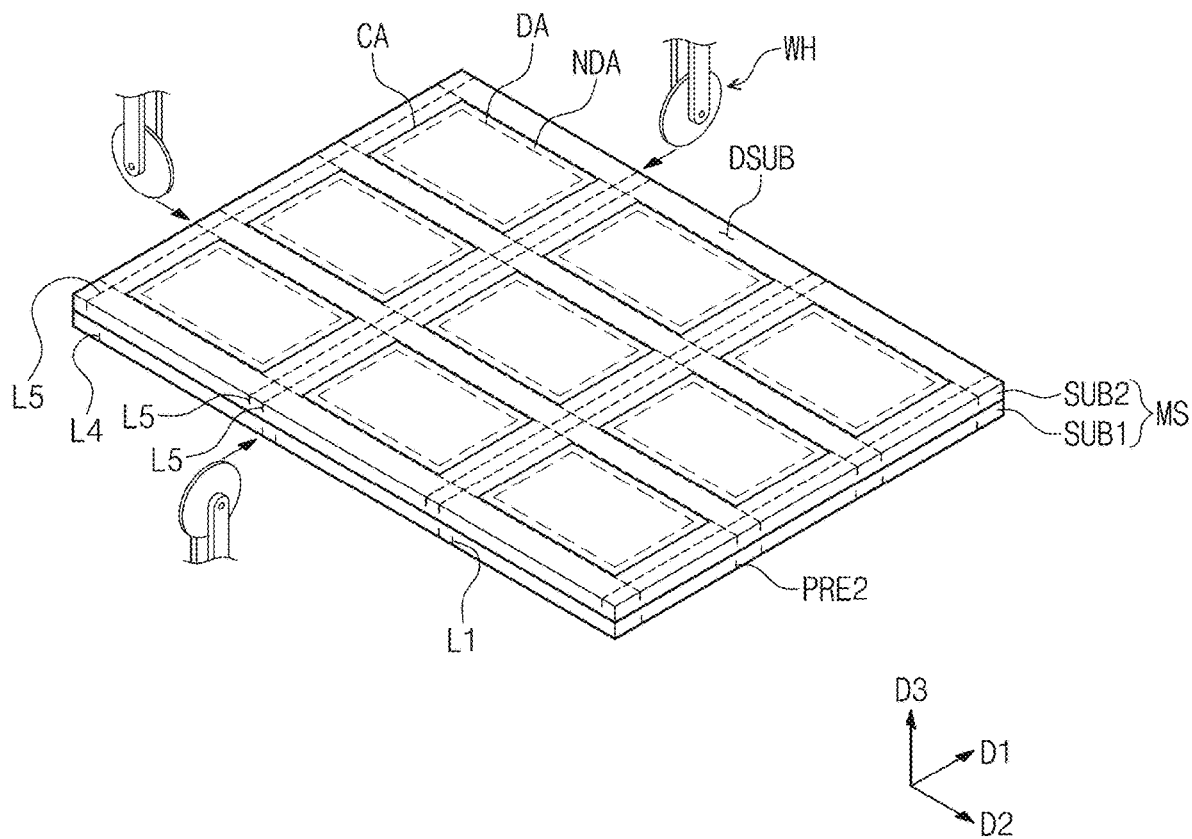
FIGS. 13 to 19 are views illustrating an embodiment of a method of manufacturing a display panel, according to the invention.
Figure 14:
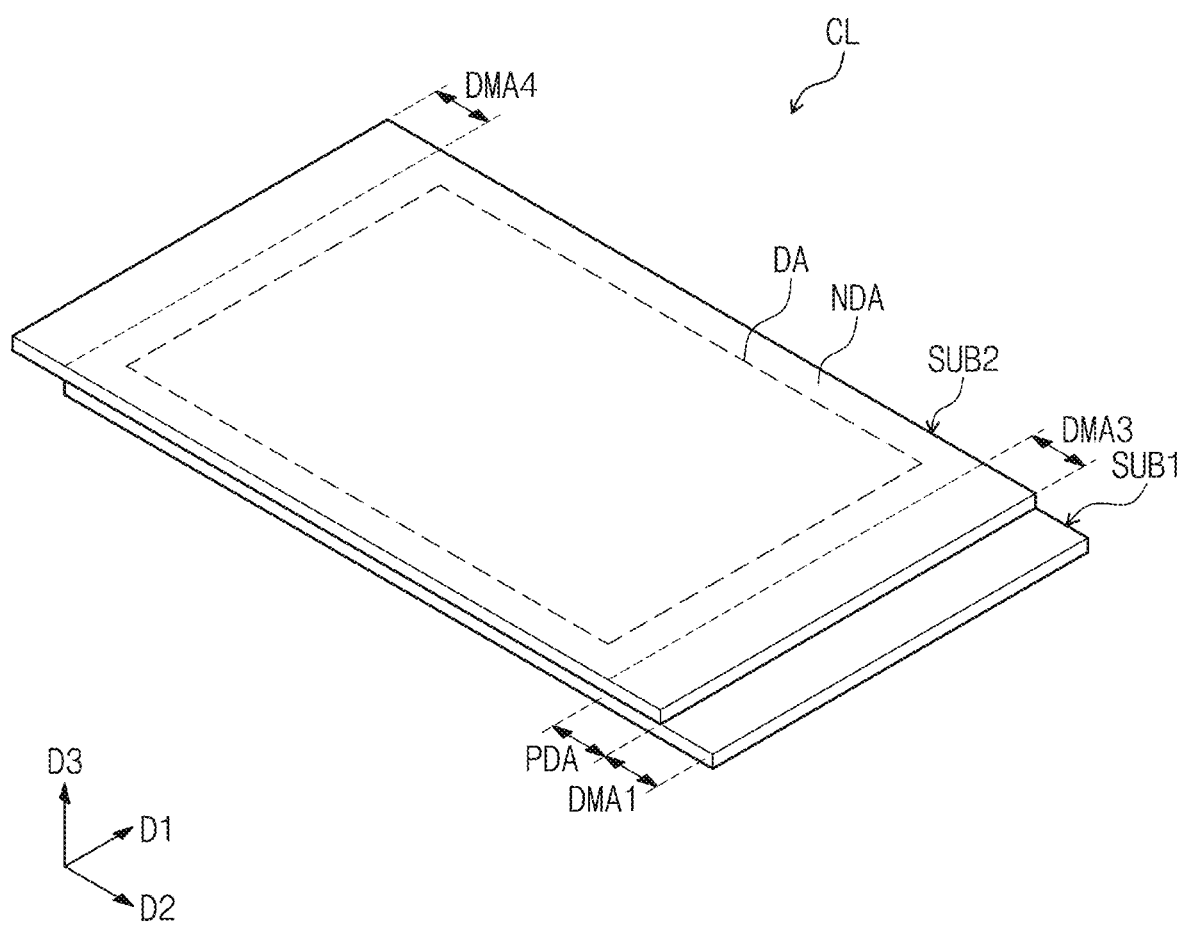

FIG. 13 is a perspective view illustrating a mother substrate MS, and FIG. 14 is a perspective view illustrating a unit cell CL.

Referring to FIGS. 13 and 14, the cell area CA provided in plurality may be divided into unit cells CL by the wheel process.

The cutting wheel WH may cut the display unit cells along a precutting lines PRE2 of the display unit cells, the precutting lines corresponding to side surfaces of the display panel which are extended in the second direction to which the reference axis is parallel, and then cut the first substrate SUB1 along a fourth predetermined cutting line L4 of the first substrate SUB1. In addition, the cutting wheel WH may cut the second substrate SUB2 along a fifth predetermined cutting line L5 of the second substrate SUB2.

As illustrated in FIG. 14, each of the display area DA, the non-display area NDA, the pad area PDA disposed at a side of the non-display area NDA in the second direction D2, and the first dummy area DMA1 disposed at a side of the pad area PDA in the second direction D2 may be defined in the first substrate SUB1 of the unit cell CL. Here, the fourth predetermined cutting line L4 may define the non-display area NDA and the first dummy area DMA1 of the first substrate SUB1. The fourth predetermined cutting line L4 may be provided in plurality each lengthwise extended in the first direction D1 and may respectively correspond to each of opposing end surfaces of the first substrate SUB1 having the first dummy area DMA1 and the non-display area NDA opposing each other along the second direction D2.

Each of the display area DA, the non-display area NDA, a third dummy area DMA3, and a fourth dummy area DMA4 may be defined in the second substrate SUB2 of the unit cell CL. The third dummy area DMA3 and the fourth dummy area DMA4 may be disposed at opposing sides of the non-display area NDA in the second direction D2, respectively. The display area DA and the non-display area NDA of the second substrate SUB2 overlap with the display area DA and the non-display area NDA of the first substrate SUB1, respectively. The third dummy area DMA3 of the second substrate SUB2 may overlap with the pad area PDA of the first substrate SUB1. The first dummy area DMA1 of the first substrate SUB1 does not overlap with the second substrate SUB2 but is exposed from the second substrate SUB2. The fourth dummy area DMA4 of the second substrate SUB2 may not overlap with the first substrate SUB1. The second substrate SUB2 may extend further than the end surface of the first substrate SUB1 at the non-display area NDA thereof. Here, the fifth predetermined cutting line L5 may define the third dummy area DMA3 and the fourth dummy area DMA4 of the second substrate SUB2. The fifth predetermined cutting line L5 may be provided in plurality each lengthwise extended in the first direction D1 and may respectively correspond to each of opposing end surfaces of the second substrate SUB2 having the third dummy area DMA3 and the fourth dummy area DMA4 opposing each other along the second direction D2

Even though not shown in the drawings, a breaking process for separating a dummy substrate DSUB adjacent to the unit cell CL may be performed after the wheel process. After the dummy substrates DSUB are separated, the unit cell CL may be provided as illustrated in FIG. 14. Pairs of the fourth and fifth predetermined cutting lines L4 and L5 each lengthwise extended in the second direction D2 may be provided in plurality and aligned with each other to correspond to a boundary between the non-display area NDA of a unit cell CL and the dummy substrates DSUB adjacent to each other in the first direction D1.

Thereafter, in the inspection of the unit cell CL, operation of the unit cell CL and/or the pixels therein are tested to determine whether the pixels PX (see FIG. 4) operate properly or are defective. The inspection using (conductive) signal lines and (terminal) pads in the unit cell CL of FIG. 14 may be substantially the same as that described for the unit cell CL in FIGS. 8A and 8B and repeated description thereof is omitted for convenience of explanation.

Similar to that described above, the first, third and fourth dummy areas DMA1, DMA3 and DMA4 of the unit cell CL in FIG. 14 may include features therein described above for the first dummy area DMA1 of the unit cell CL in FIGS. 8A and 8B, without being limited thereto. For any of the first, third and fourth dummy areas DMA1, DMA3 and DMA4 of the unit cell CL in FIG. 14, layers and/or elements of the respective dummy area may not be necessary in the display panel DP formed from the unit cell CL of FIG. 14. Therefore, the respective dummy areas may be separated from a remainder of the unit cell CL in FIG. 14 forming a portion of the display panel DP.

Figure 15:
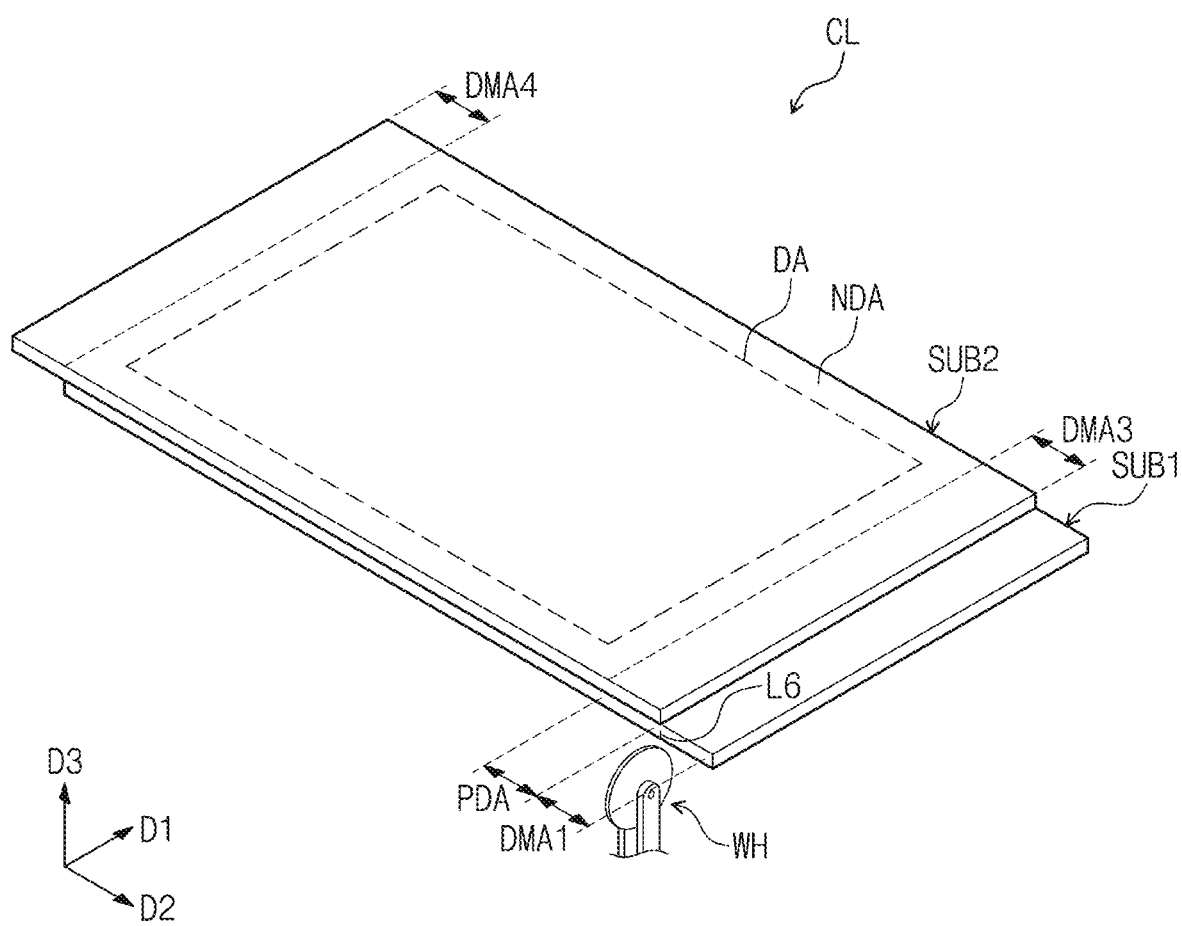
Figure 16:
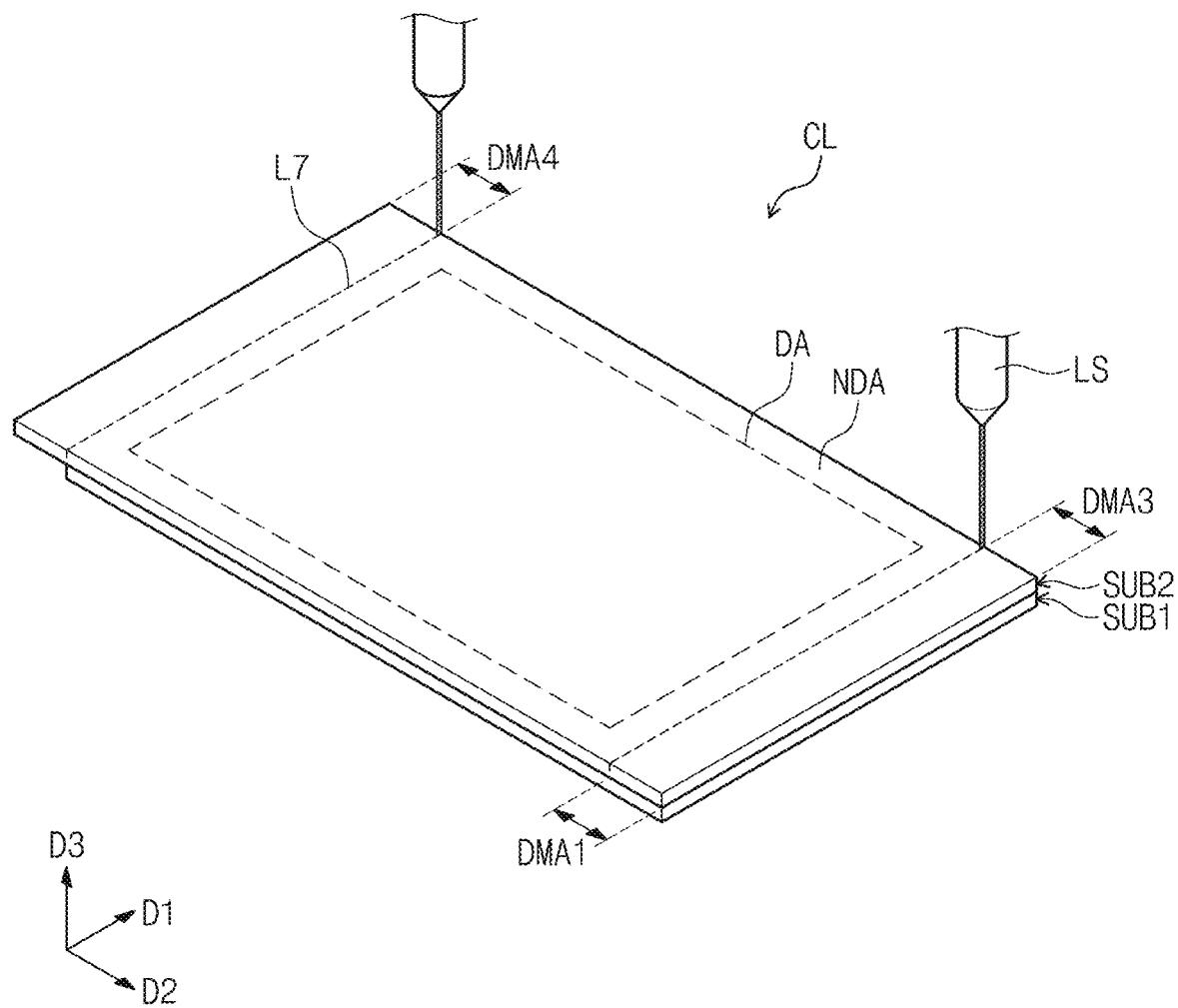
Figure 17:
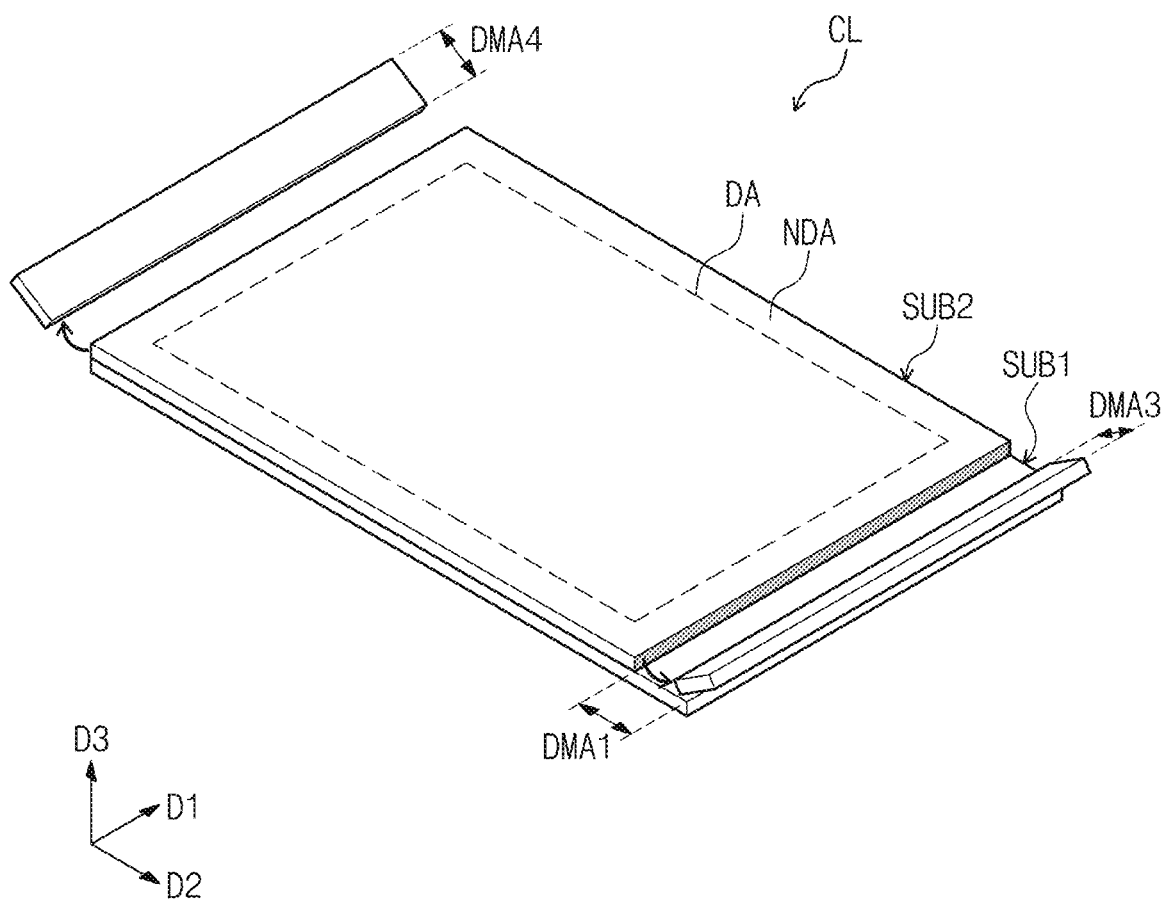

FIGS. 15 to 17 are perspective views of the unit cell CL to illustrate a process of separating the dummy areas from the unit cell CL.

Referring to FIG. 15, the process of separating the dummy areas may include a process of cutting the first dummy area DMA1 to be separated from a remainder of the first substrate SUB1. The process of cutting the first dummy area DMA1 may be performed using the cutting wheel WH. The cutting wheel WH may cut the first substrate SUB1 along a sixth predetermined cutting line L6 of the first substrate SUB1 corresponding to a boundary between the first dummy area DMA1 and the pad area PDA, which may correspond to the outer edge of the second substrate SUB2 at the third dummy area DMA3 thereof. The sixth predetermined cutting line L6 may lengthwise extend in the first direction D1 and may define the pad area PDA of the first substrate SUB1.

Referring to FIG. 16, the process of separating the dummy areas may further include a process of cutting the third dummy area DMA3 and a process of cutting the fourth dummy area DMA4 to be separated from a remainder of the second substrate SUB2.

Here, the third dummy area DMA3 and the fourth dummy area DMA4 may be cut away from the remainder of the second substrate SUB2 using laser LS.

The laser LS may cut the second substrate SUB2 along a seventh predetermined cutting line L7 of the second substrate SUB2 corresponding to a boundary between the non-display area NDA of the second substrate SUB2 and each of the third and fourth dummy areas DMA3 and DMA4 thereof. The seventh predetermined cutting line L7 may be provided in plurality each lengthwise extending in the first direction D1 and may define the non-display area NDA of the second substrate SUB2. The seventh predetermined cutting line L7 does not overlap with the sealant ST (see FIG. 4).

Referring to FIG. 17, after the third and fourth dummy areas DMA3 and DMA4 are cut to be separated from the remainder of the second substrate SUB2 using the laser LS, a breaking process may be performed to separate the third and fourth dummy areas DMA3 and DMA4. The breaking and removing of the third and fourth dummy areas DMA3 and DMA4 after the laser cutting at the seventh predetermined cutting line L7 defines the opposing end surfaces of the second substrate SUB2 forming of the cell unit CL forming a portion of the display panel DP.

A (surface) roughness of cross sections (e.g., side surfaces or end surfaces) of the second substrate SUB2 which is formed by the laser LS may be less than (surface) roughnesses of cross sections (e.g., side surfaces) of the first and second substrates SUB1 and SUB2 which are formed by the cutting wheel WH. In addition, the cross sections of the second substrate SUB2 which are formed by the laser LS may be denatured by heat of the laser LS, and thus a strength of the cut cross sections of the second substrate SUB2 may be stronger than that of a peripheral portion thereof.

Since the first, third and fourth dummy areas DMA1, DMA3 and DMA4 are separated from a remainder of the unit cell CL, a display panel DP may be provided or realized by the remainder of the unit cell CL. In the display panel DP, first to fourth side surfaces SS1 to SS4 are each exposed outside the display panel DP.

Figure 18A:
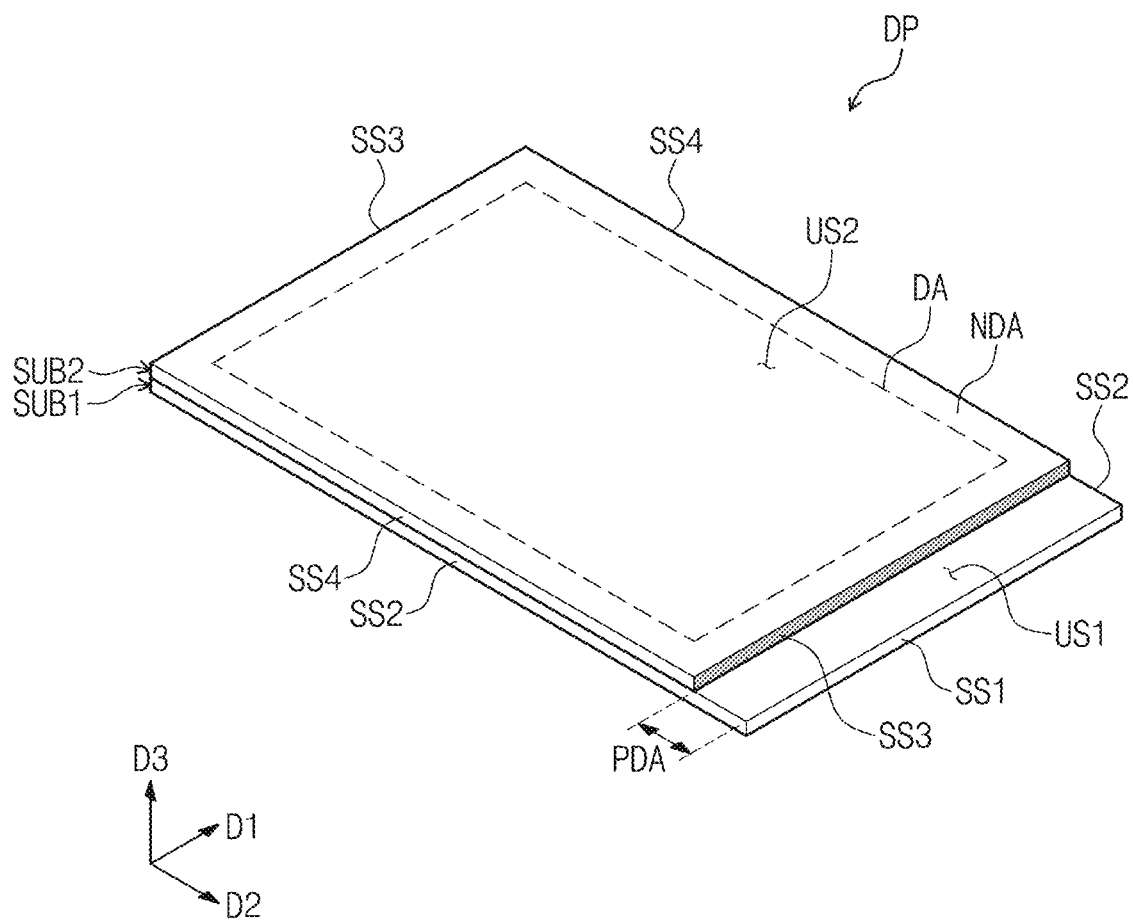
Figure 18B:
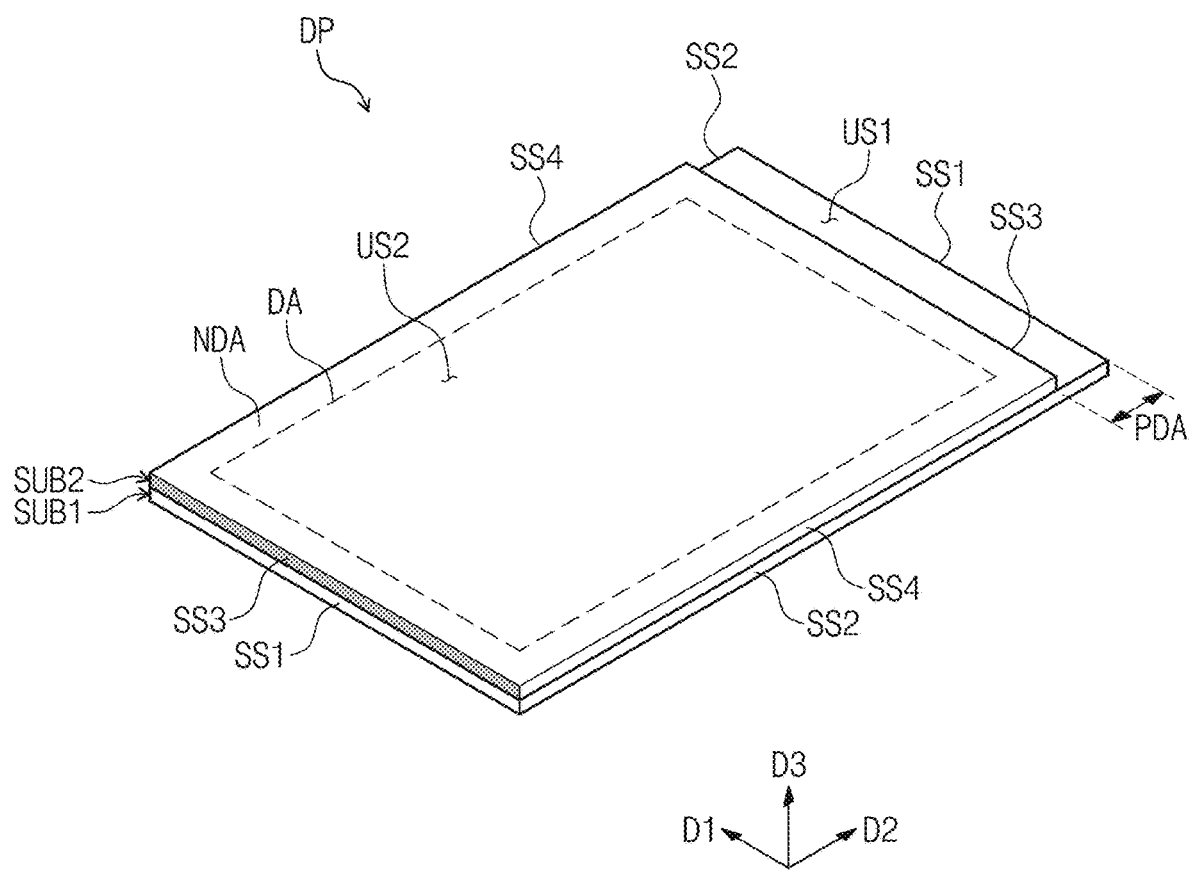

FIGS. 18A and 18B are perspective views illustrating the display panel DP.

Referring to FIGS. 18A and 18B, a roughness of third side surfaces SS3 of the second substrate SUB2 of the display panel DP may be less than a roughness of fourth side surfaces SS4 of the second substrate SUB2. In addition, roughnesses of first and second side surfaces SS1 and SS2 of the first substrate SUB1 of the display panel DP may be substantially equal to the roughness of the fourth side surfaces SS4. In FIGS. 18A and 18B, the larger strength of the third side surfaces SS3 is indicated by a shaded area at end surfaces thereof. The absence of a shaded area at the first, second and fourth side surfaces SS1, SS2 and SS4 indicates a smaller strength at end surfaces thereof compared to the end surfaces of the third side surfaces SS3

Figure 19:
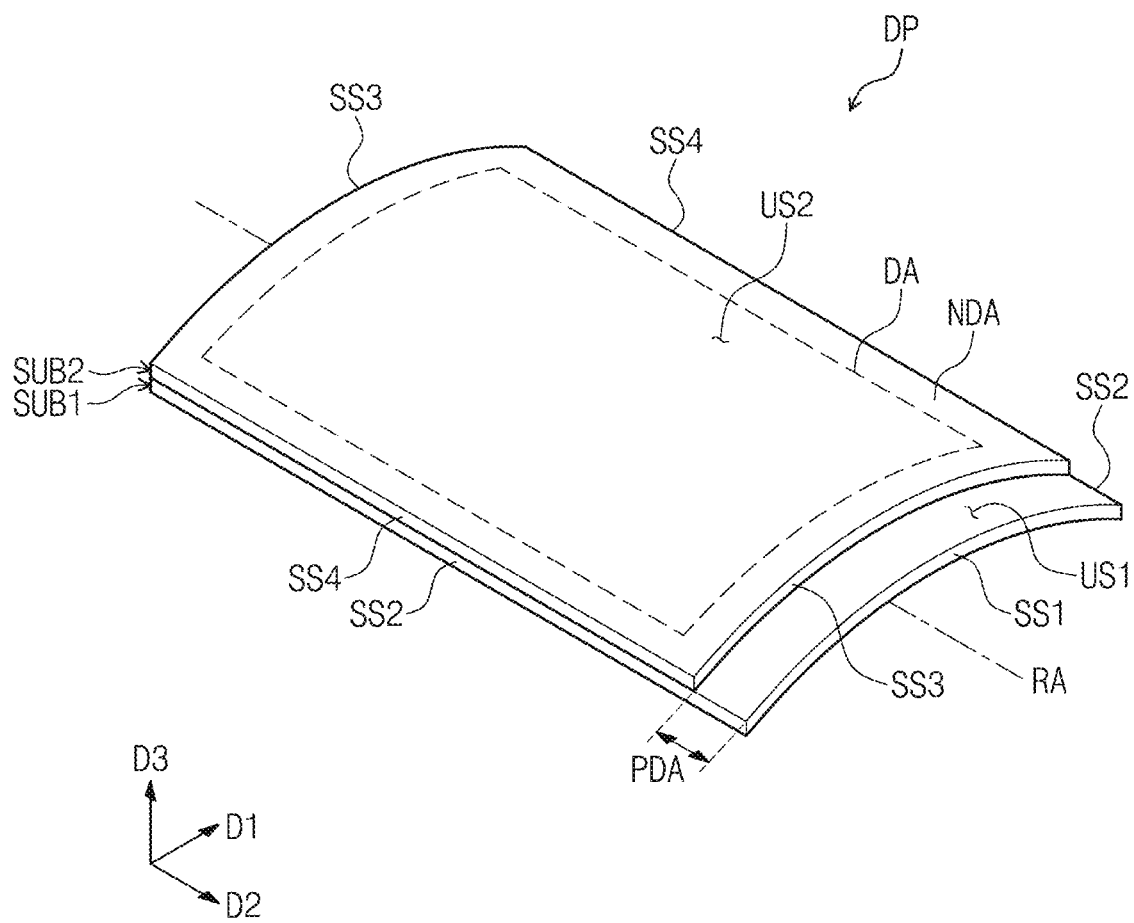

FIG. 19 is a perspective view illustrating the display panel DP provided or realized by the remainder of the unit cell CL, in a curved state.

Referring to FIG. 19, the display panel DP may be provided in a curved shape. At this time, the display panel DP may be curved by a force applied from an external tool or an external member of the display device DD such as the case CS (see FIG. 2).

The display panel DP may be curved with respect to a reference axis RA which is parallel to the second direction D2 and is closer to the first substrate SUB1 than the second substrate SUB2.

At this time, since the roughness of the third side surfaces SS3 is less than the roughnesses of the first, second and fourth side surfaces SS1, SS2 and SS4 among surfaces exposed outside the display panel DP, occurrence of a crack at the third side surfaces SS3 may be reduced or inhibited even though a tensile stress applied to the second substrate SUB2 is greater than a tensile stress applied to the first substrate SUB1.

In addition, since the strength of the third side surfaces SS3 is greater than the strengths of the first, second and fourth side surfaces SS1, SS2 and SS4, occurrence of a crack at the third side surfaces SS3 may be reduced or inhibited even though a tensile stress applied to the second substrate SUB2 is greater than a tensile stress applied to the first substrate SUB1.

Furthermore, in one or more embodiment of the invention, the wheel process may be performed on the first and second substrates SUB1 and SUB2 at the same time, and then, the laser cutting process may be performed only on the second substrate SUB2. Thus, a process time can be reduced as compared with a case in which a laser cutting process is successively performed on the first substrate SUB1 and the second substrate SUB2.

According to one or more embodiments of the invention, a crack of one or more end side surface of the display panel may be inhibited or prevented to improve the curved characteristics of the display panel.

While the invention has been described with reference to exemplary embodiments, it will be apparent to those skilled in the art that various changes and modifications may be made without departing from the spirits and scopes of the invention. Therefore, it should be understood that the above embodiments are not limiting, but illustrative. Thus, the scopes of the invention are to be determined by the broadest permissible interpretation of the following claims and their equivalents, and shall not be restricted or limited by the foregoing description.

What is claimed is:
1. A display panel comprising:
   a first substrate;
   a second substrate facing the first substrate and coupled thereto; and
   a display element layer disposed between the first substrate and the second substrate and providing an image,
   wherein
   each of the first substrate and the second substrate includes a first side surface and a second side surface, each of the first side surface and the second side surface extending in a first direction and spaced apart from each other in a second direction crossing the first direction, and
   the first substrate, the second substrate, and display element layer are curved with respect to a reference axis extending in the second direction, and
   a roughness of the first side surface and the second side surface of the substrate disposed adjacent to the reference axis among the substrates is greater than a rough- ness of the first side surface and the second side surface of the substrate disposed away from the reference axis.

2. The display panel of claim 1, wherein the reference axis is provided on the second substrate.

3. The display panel of claim 1, wherein the reference axis is provided under the first substrate.

4. The display panel of claim 1, wherein the first side surface and the second side surface included in the same substrate have the same roughness.

5. The display panel of claim 1, wherein a strength of the first side surface and the second side surface of the substrate disposed away from the reference axis is greater than a strength of the first side surface and the second side surface of the substrate disposed adjacent to the reference axis among the substrates.

6. The display panel of claim 1, further comprising a display area in which the image is displayed with the light, and a non-display area surrounding the display area, and
wherein the image is provided in a direction from the first substrate toward the second substrate.

7. The display panel of claim 1, further comprising:
a display area in which the image is displayed with the light, and a non-display area surrounding the display area, and
a sealant overlapping with the non-display area and disposed between the first substrate and the second substrate to surround the display element layer,
wherein
the sealant comprises:
first and second sub-sealants each being lengthwise parallel to the first direction and facing each other with the display element layer interposed therebetween in the second direction; and
third and fourth sub-sealants each being lengthwise parallel to the second direction and connecting the first and second sub-sealants to each other,
the first and second sub-sealants have a constant hardness in the second direction, and
the first and second sub-sealants are closer to the display area in the second direction than the first side surfaces of each of the first substrate and the second substrate, when viewed in a top plan view.

8. The display panel of claim 1, further comprising a display area in which the image is displayed with the light, and a non-display area surrounding the display area, and
wherein the image is provided in a direction from the second substrate toward the first substrate.

9. A method of manufacturing a display panel, the method comprising:
providing a mother substrate in which a plurality of display cell areas is defined from which the display panel will be formed, the display cell areas arranged in a first direction and a second direction which crosses the first direction, each display cell area comprising:
a display unit cell corresponding to the display panel, comprising a first substrate and a second substrate coupled to each other with a display element layer by which transmission of light through the display panel is controlled to display an image with the light, and
a dummy area extended along the first direction and the second direction from the display unit cell, portions of the first substrate or the second substrate defining the dummy area;
separating the dummy area from the display unit cell; and
curving the display unit cell from which the dummy area is separated, with reference to a reference axis which is parallel to the second direction, to dispose one substrate among the first and second substrates further from the reference axis than the other substrate along a third direction which crosses each of the first direction and the second direction and to form the display panel including first side surfaces lengthwise extending in the first direction and second side surfaces lengthwise extending in the second direction,
wherein the separating the dummy area from the display unit cell includes performing:
on the other substrate, a wheel cutting process along each of precutting lines corresponding to the first side surfaces of the display panel and along each of first cutting lines corresponding to the second side surfaces of the display panel; and
on the one substrate which is further from the reference axis, both of:
the wheel cutting process along the first cutting lines corresponding to the second side surfaces of the display panel, and
a laser cutting process along second cutting lines corresponding to the first side surfaces of the display panel.

10. The method of claim 9, wherein
the first substrate of the display unit cell is the other substrate among the first and second substrates which is further from the reference axis and comprises:
a display area in which the image is displayed
a non-display area surrounding the display area;
a pad area disposed extended from a first side of the non-display area in the second direction;
a first dummy area disposed extended from the pad area at a first side of the non-display area, in the second direction; and
a second dummy area disposed extended from a second side of the non-display area which is opposite to the first side thereof, in the second direction, and
the second substrate of the display unit cell overlaps with the display area and the non-display area of the first substrate and does not overlap with the pad area, the first dummy area and the second dummy area of the first substrate.

11. The method of claim 10, wherein in the separating of the dummy area, the laser process comprises cutting the first substrate as the other substrate among the first and second substrates which is further from the reference axis, along the second cutting lines which further correspond to:
a first boundary between the first dummy area and the pad area, extended along the first direction; and
a second boundary between the second dummy area and the non-display area, extended along the first direction.

12. The method of claim 10, wherein
the second substrate comprises a display area in which the image is displayed and a non-display area surrounding the display area, respectively corresponding to the display area and the non-display area of the first substrate,
the precutting lines define the non-display area of each of the first and second substrate along the first direction,
the first cutting lines respectively define outer boundaries of the first dummy area and the second dummy area of the first substrate along the second direction, and
the second cutting lines define the non-display area and the pad area of the first substrate along the second direction.

13. The method of claim 12, wherein the first substrate as the other substrate among the first and second substrates which is further from the reference axis comprises:

a pad in the pad area thereof, electrically connected to the display area of the first substrate, and
a test pad in the first dummy area thereof, electrically connected to the pad in the pad area and through which a test signal is applied to the pad,
further comprising inspecting the unit cell after the dividing of the mother substrate into the display unit cells, wherein the inspecting of the unit cell comprises applying the test signal to the test pad disposed in the first dummy area.

14. The method of claim 9, wherein the laser cutting process is performed using carbon dioxide ($CO_2$) laser in the separating of the dummy area.

15. The method of claim 9, wherein in the separating of the dummy area,
a portion of the other substrate among the first and second substrates which is further from the reference axis defines the dummy area,
the laser process further comprises cutting the other substrate which defines the dummy area along the second cutting lines which further correspond to boundaries between the dummy area and the display unit cell, and
the portion of the other substrate which defines the dummy area is separated from the display unit cell by using a vacuum breaker.

16. The method of claim 9, wherein
the display unit cell corresponding to the display panel further comprises a sealant which surrounds the display element layer and is between the first substrate and the second substrate, and
the second cutting lines along which the other substrate among the first and second substrates which is further from the reference axis is cut, do not overlap with the sealant.

17. The method of claim 9, wherein
the first substrate of the display unit cell is the other substrate among the first and second substrates which is further from the reference axis and comprises:
a display area in which an image is displayed;
a non-display area surrounding the display area; and
a first dummy area and a second dummy area disposed at opposing sides of the non-display area in the second direction, respectively, and
the second substrate of the display unit cell overlaps with the display area and the non-display area of the first substrate, the second substrate comprising:
a pad area overlapping with the first dummy area of the first substrate; and
a third dummy area extended from the pad area in the second direction.

18. The method of claim 17, wherein in the separating of the dummy area, the laser process comprises cutting the first substrate as the other substrate among the first and second substrates which is further from the reference axis, along the second cutting lines which further correspond to:
a first boundary between the first dummy area the non-display area, extended along the first direction; and
a second boundary between the second dummy area and the non-display area, extended along the first direction.

19. The method of claim 18, wherein
the second substrate further comprises a display area in which the image is displayed and a non-display area surrounding the display area, respectively corresponding to the display area and the non-display area of the first substrate,
the precutting lines define the non-display area of each of the first and second substrate along the first direction,
the first cutting lines define the non-display area and an outer boundary of the third dummy area of the second substrate, along the second direction, and
the second cutting lines define the non-display area of the first substrate, along the second direction.

20. The method of claim 18, wherein the separating of the dummy area further comprises a wheel cutting process in which the second substrate is cut along the second cutting lines which further correspond to a boundary between the third dummy area and the pad area.

* * * * *